(12) United States Patent
Roy et al.

(10) Patent No.: US 7,877,927 B2
(45) Date of Patent: Feb. 1, 2011

(54) MODULAR AEROPONIC/HYDROPONIC CONTAINER MOUNTABLE TO A SURFACE

(75) Inventors: Mario Roy, 188, Rangs 5 and 6, C.P., 755, Ryain, Quebec, J0Z 1Y0 (CA); Jean-Pierre Morin, Quebec (CA)

(73) Assignee: Mario Roy, Evain, Quebec (CA)

( * ) Notice: Subject to any disclaimer, the term of this patent is extended or adjusted under 35 U.S.C. 154(b) by 0 days.

(21) Appl. No.: 11/303,194

(22) Filed: Dec. 16, 2005

(65) Prior Publication Data
US 2006/0156624 A1     Jul. 20, 2006

Related U.S. Application Data

(60) Provisional application No. 60/636,108, filed on Dec. 16, 2004.

(51) Int. Cl.
*A01G 31/06* (2006.01)

(52) U.S. Cl. .................. 47/62 C; 47/62 A; 47/62 R

(58) Field of Classification Search .............. 47/62 R, 47/62 A, 62 C, 62 E, 62 N, 63, 79, 59 R, 47/83, 82, 67, 48.5; A01G 31/06, 31/02
See application file for complete search history.

(56) References Cited

U.S. PATENT DOCUMENTS

| | | | | |
|---|---|---|---|---|
| 2,585,698 | A * | 2/1952 | Spring | 119/456 |
| 4,101,036 | A | 7/1978 | Craig | |
| 4,216,617 | A | 8/1980 | Schmidt | |
| 4,255,896 | A * | 3/1981 | Carl | 47/62 C |
| 4,324,069 | A * | 4/1982 | Flagg | 47/62 E |
| 4,332,105 | A | 6/1982 | Nir | |
| 4,857,464 | A * | 8/1989 | Weathers et al. | 435/401 |
| 4,869,019 | A | 9/1989 | Ehrlich | |
| 5,428,922 | A * | 7/1995 | Johnson | 47/82 |
| 5,724,768 | A * | 3/1998 | Ammann, Jr. | 47/62 A |
| 6,000,173 | A | 12/1999 | Schow et al. | |
| 6,021,602 | A | 2/2000 | Orsi | |
| 6,219,966 | B1 * | 4/2001 | Lapointe et al. | 47/62 C |
| 6,502,350 | B1 * | 1/2003 | Dick | 47/62 R |
| 6,615,542 | B2 * | 9/2003 | Ware | 47/83 |
| 6,724,091 | B1 | 4/2004 | Jayaraman et al. | |
| 7,080,482 | B1 * | 7/2006 | Bradley | 47/60 |
| 7,108,235 | B2 * | 9/2006 | Kanashiki | 248/125.1 |
| 7,143,544 | B2 * | 12/2006 | Roy | 47/60 |
| 7,243,460 | B2 * | 7/2007 | Darlington | 47/62 R |

FOREIGN PATENT DOCUMENTS

| | | |
|---|---|---|
| CA | 2176274 | 11/1997 |
| EP | 0 533 939 | 3/1993 |
| EP | 1 210 868 | 6/2002 |

(Continued)

*Primary Examiner*—Rob Swiatek
*Assistant Examiner*—Kristen C Hayes
(74) *Attorney, Agent, or Firm*—Ladas & Parry LLP

(57) ABSTRACT

A modular container for aeroponic and/or hydroponic cultivation of plants comprising vertical columns of cultivating compartments for cultivating plants A vertical nutrient conduit for delivers a nutrient solution to the cultivating compartments. A vertical water conduit is in communication with the cultivating compartment. Mounting elements provide for mounting the container on a vertical support. When at least two like containers are vertically mounted on a vertical support with one container adjacently above another the respective nutrient and water conduits of the like containers are in fluid communication.

32 Claims, 23 Drawing Sheets

FOREIGN PATENT DOCUMENTS

| | | | |
|---|---|---|---|
| GB | 2149282 A * | 6/1985 |
| GB | 2431328 A1 * | 4/2007 |
| JP | 05000028 A * | 1/1993 |
| JP | 08172948 | 9/1996 |
| JP | 2003-038049 | 12/2003 |
| NL | 9201632 * | 4/1994 |
| RU | 2015663 C1 * | 7/1994 |
| WO | WO 8803360 A1 * | 5/1988 |
| WO | WO 92/15194 | 9/1992 |
| WO | WO 96/10328 | 4/1996 |
| WO | WO 02/09500 | 2/2002 |

* cited by examiner

FIG_3

FIG_4

FIG_5

FIG_7

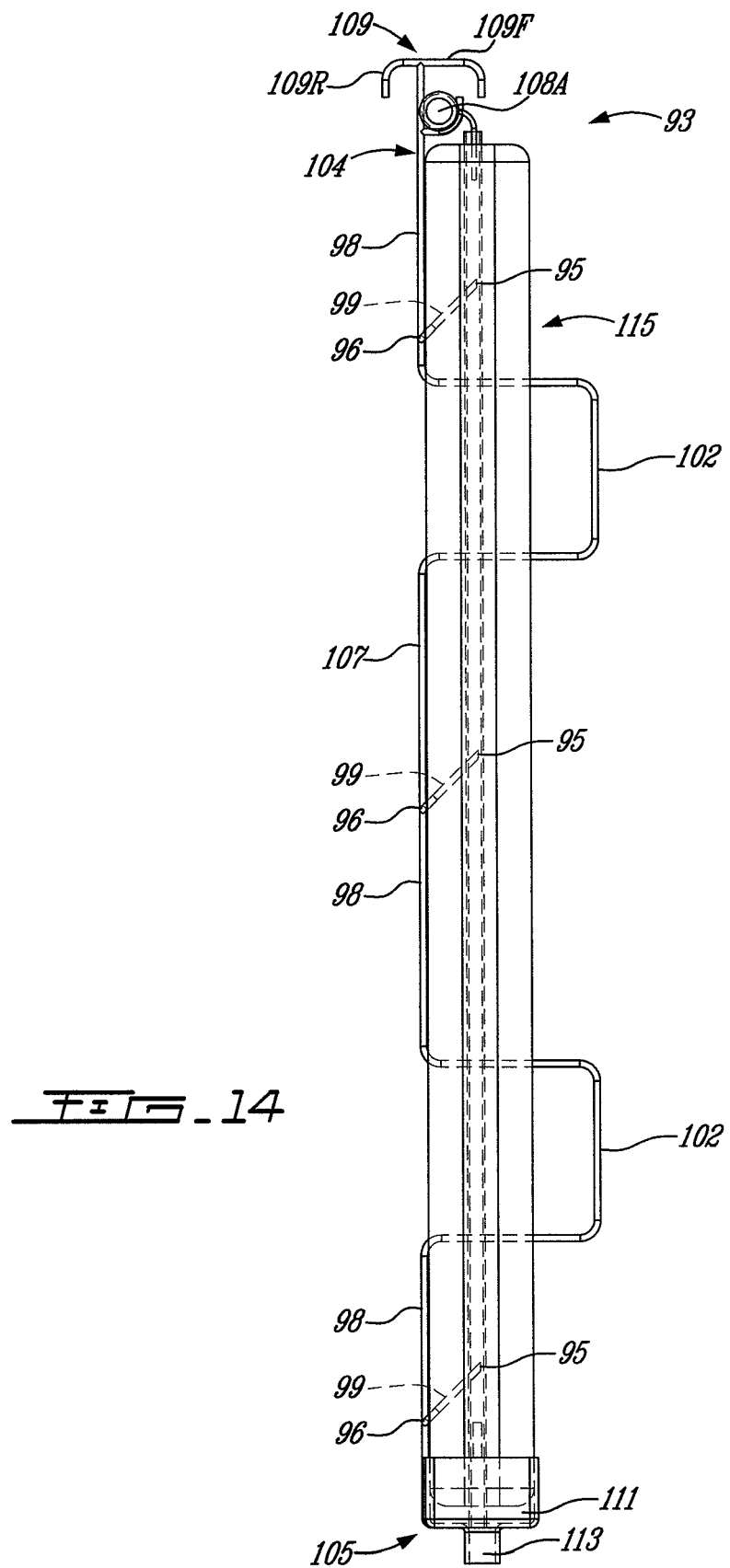

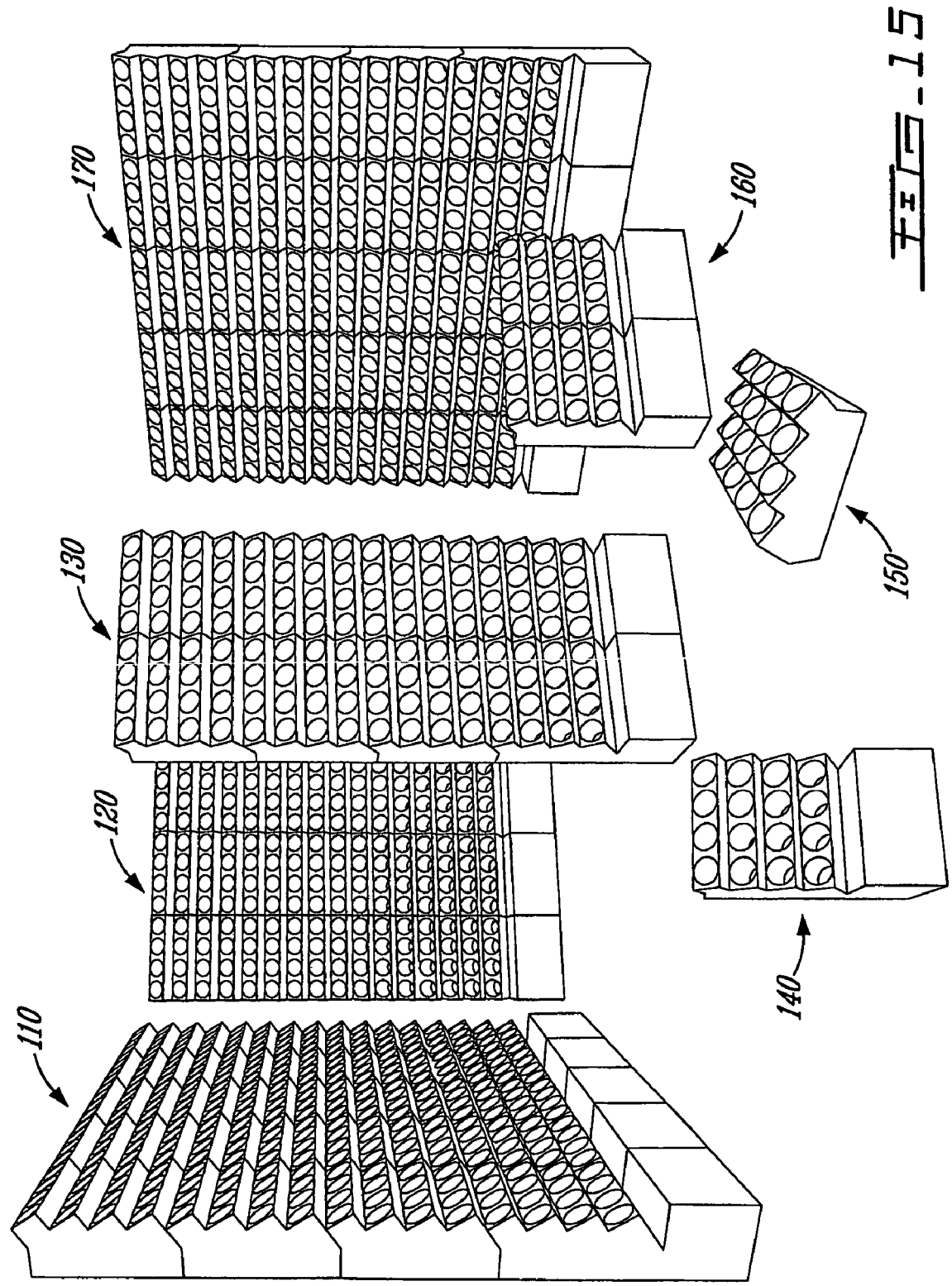

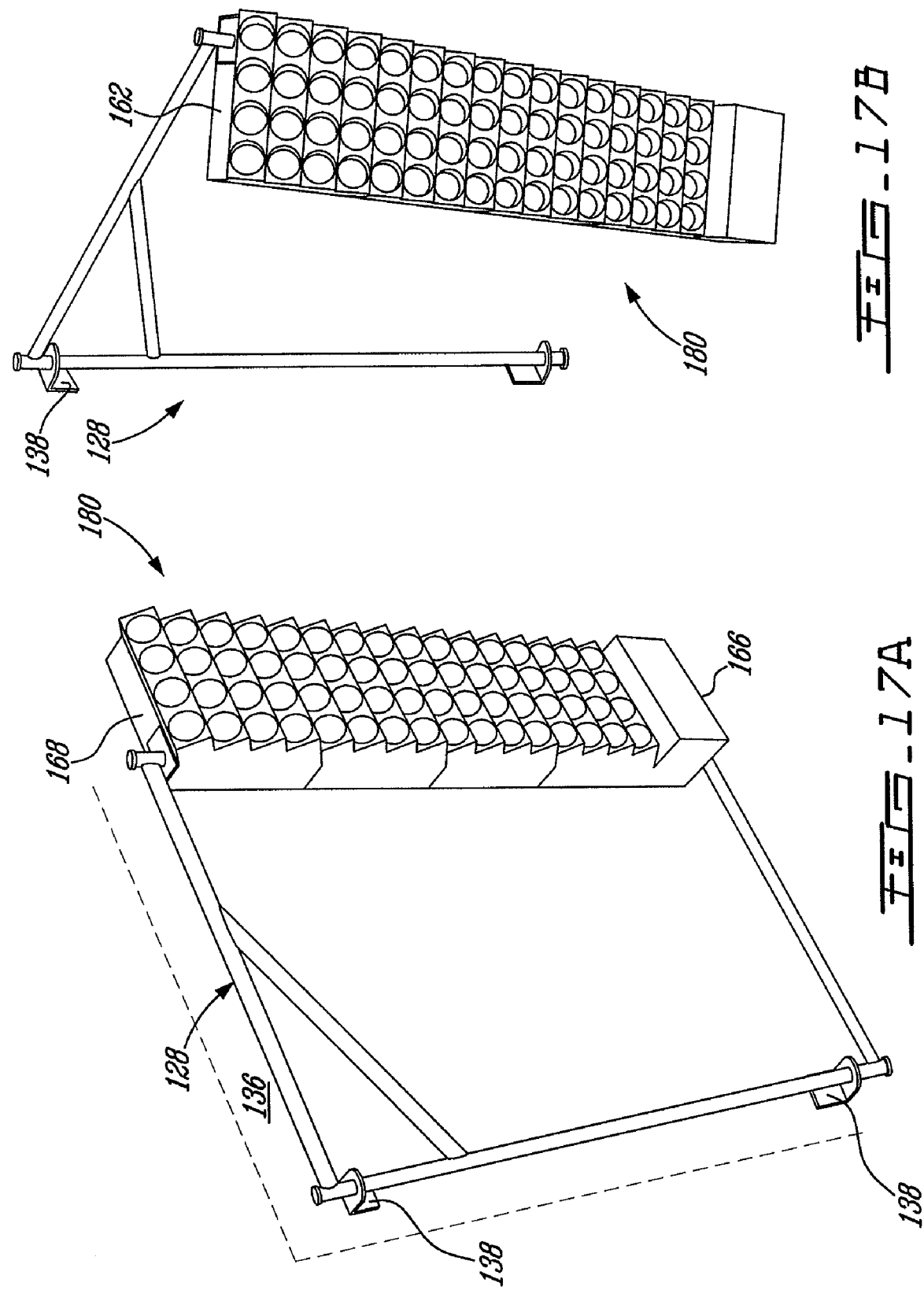

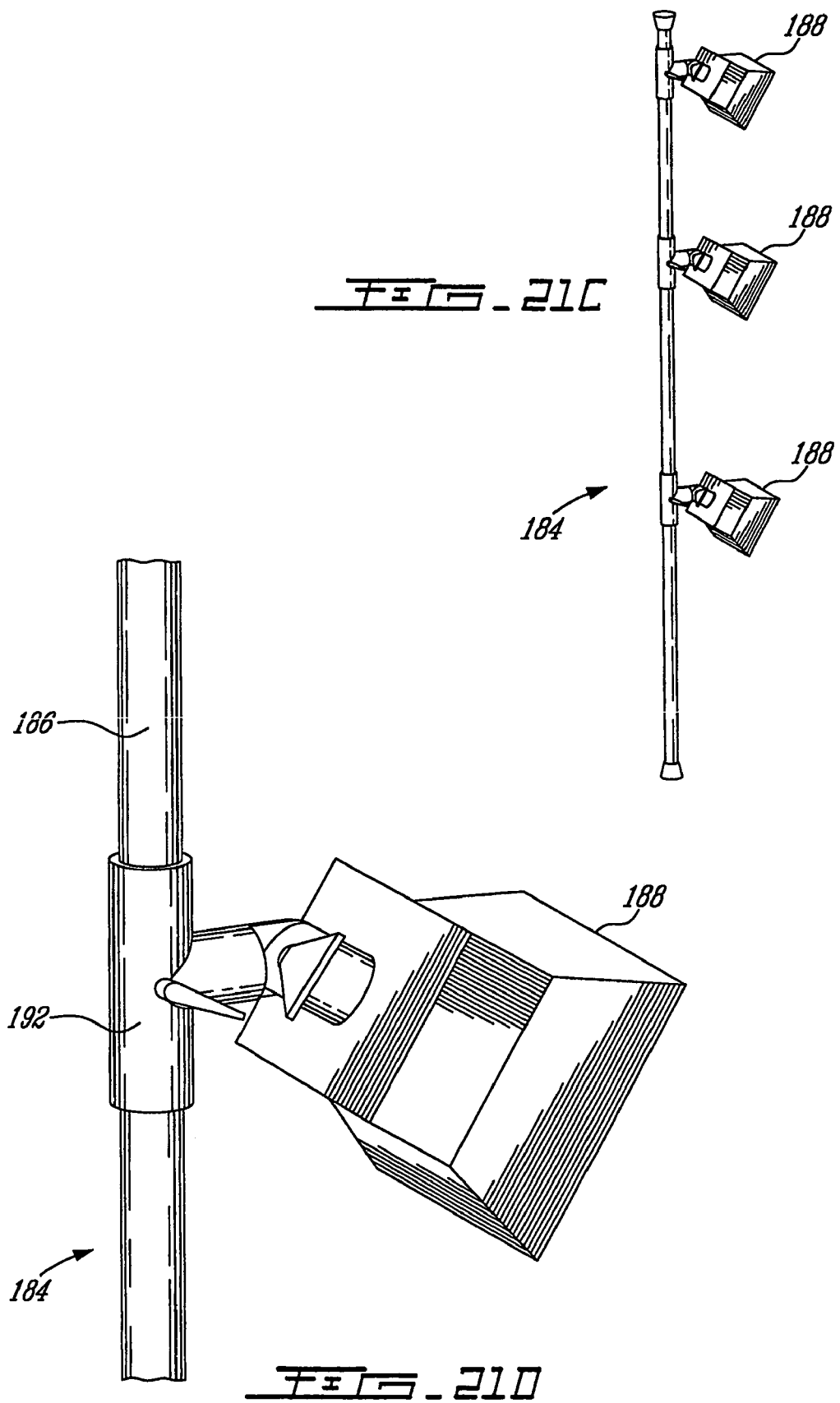

MODULAR AEROPONIC/HYDROPONIC CONTAINER MOUNTABLE TO A SURFACE

CROSS REFERENCE TO RELATED APPLICATIONS

This application claims priority on U.S. provisional application No. 60/636,108 filed on Dec. 16, 2004 the content of which is herein incorporated by reference in their entirety.

FIELD OF THE INVENTION

The present invention relates to an aeroponic/hydroponic container. More specifically, the present invention is concerned with a modular aeroponic/hydroponic container that is mountable to a surface such as a wall or ceiling.

BACKGROUND OF THE INVENTION

Vertical hydroponic or aeroponic structures are known in the art.

For example, U.S. Pat. No. 6,021,602 issued to Orsi on Feb. 8, 2000 teaches a modular structure for aeroponic cultivation comprising a plurality of prefabricated vertical panels which have openings in order to receive cultures therein. U.S. Pat. No. 4,869,019 issued to Ehrlich on Sep. 26, 1989 teaches a self contained aeroponic apparatus having a reservoir for containing nutrient solution and a substantially vertical support. European patent application No. 0533939 filed on Mar. 5, 1992 teaches a perforated panel that has a substantially vertical orientation with a small inclination. The holes in the panel are configured to contain absorbing tampons for water in order to support plants. International application WO 02/09500 A1 teaches a hydroponic system having a vertical wall made of hollow tubes and an irrigation system as well as modules elements for receiving plants therein. European patent application No. 1210868 filed on Jan. 27, 2000 teaches a panel for supporting plants, the panels are mounted in between guard rails, their back sides provide for exposing the roots of the plants so as to be pulverized via spray nozzles with nutrient and water, their front sides are exposed to a light source.

SUMMARY OF THE INVENTION

More specifically, in accordance with the present invention, there is provided a modular container for aeroponic and/or hydroponic cultivation of plants, the container comprising: at least one vertical column comprising at least one cultivating compartment for cultivating plants; a vertical nutrient conduit for delivering a nutrient solution to the at least one cultivating compartment; a vertical water conduit in communication with the at least one cultivating compartment, and mounting elements for mounting the container on a vertical support; wherein when at least two like containers are vertically mounted on a vertical support with one container adjacently above another container thereby respectively defining top and bottom containers, the respective nutrient and water conduits of the like containers being in fluid communication.

In an embodiment, the vertical nutrient conduit comprises an intake aperture at a top end thereof and an outtake aperture at a bottom end thereof. In an embodiment, the nutrient conduit outtake aperture of the top container is in fluid communication with the nutrient conduit intake aperture of the bottom container. In an embodiment, the outtake aperture of the top container is in fluid communication with the intake aperture of the bottom container via an auxiliary conduit. In an embodiment, the auxiliary conduit comprises a short tube. In an embodiment, the intake aperture is continuous with an intake conduit and the outtake aperture is contiguous with an outtake conduit. In an embodiment, the vertical nutrient conduit comprises an auxiliary delivery conduit for delivering the nutrient solution to the cultivating compartment. In an embodiment, the auxiliary delivery conduit comprises a nozzle for pulverizing solution on the roots of plants. In an embodiment, the auxiliary delivery conduit comprises an irrigation member. In an embodiment, the vertical nutrient conduit comprises a longitudinal tubular member.

In an embodiment, the vertical water conduit comprises a water-conduit intake end at a top end thereof and a water-conduit outtake at a bottom end thereof. In an embodiment, the water-outtake aperture of the top container is in fluid communication with the water-intake aperture of the bottom container. In an embodiment, the water-intake aperture and water-outtake aperture are contiguous with respective intake and outtake tube members. In an embodiment, vertical water conduit is defined by the vertical column.

In an embodiment, the container further comprises an enclosed body comprising a front face with the at least one cultivating compartment and an opposite rear face with the mounting elements.

In an embodiment, the cultivating compartment comprises removable cover for covering a pot for holding the plant therein. In an embodiment, the cover comprises an aperture for providing plant growth therethough and for allowing light to be exposed with the cultivating compartment. In an embodiment, the cover comprises an aperture for receiving an irrigation member therethrough.

In an embodiment, the cultivating compartment comprises a front sloped face. In an embodiment, the cultivating compartment comprises an opening for receiving a nutrient solution pulverizing member therethrough.

In an embodiment, the container further comprises at least two the columns, the at least two columns comprising a plurality of rows of the cultivating compartments. In an embodiment, the vertical nutrient conduit is positioned between the at least two columns. In an embodiment, the nutrient conduit is removable.

In an embodiment, the nutrient conduit branches out to a plurality of auxiliary delivery conduits, each the delivery conduits in communication with a respective the cultivating compartment. In an embodiment, the auxiliary delivery conduits is selected from the group consisting of an irrigation member, a pulverizing member and a combination thereof.

In an embodiment, the mounting elements are support members for mounting to a vertical surface.

In an embodiment, the vertical nutrient conduit of the bottom container is in communication with an evacuation member. In an embodiment, the vertical water conduit of the bottom container is in communication with a drainage member.

In an embodiment, the container further comprises a bottom portion, the bottom portion comprising a drainage conduit in communication with the water conduit, the bottom portion comprising a membrane for substantially blocking solid material from entering into the drainage conduit. In an embodiment, the bottom portion comprises a front wall a bottom wall and a rear wall, the membrane being mounted between the front and rear walls. In an embodiment, the membrane and the bottom wall define a cavity therebetween, the cavity being in fluid communication with the drainage conduit. In an embodiment, the membrane comprises perforations and is covered with a tissue. In an embodiment, the tissue comprises geodesic tissue.

In an embodiment, the cultivating compartment comprises an open front face for receiving a substrate therein and retaining members for retaining the substrate in the compartment. In an embodiment, the substrate comprises rock-wool bread. In an embodiment, the retaining members comprise brackets spanning the front open face. In an embodiment, the retaining members comprise staple members for piercing through the substrate and being mountable on the container.

In an embodiment, the container further comprising a handle member protruding from a front face of the container. In an embodiment, the container further comprises two side by side column compartments, a stem running therebetween and being bent so as to define the handles.

In an embodiment, the container further comprises a receptacle portion at a bottom portion of the container.

In an embodiment, the mounting elements comprise a longitudinal member mountable to the vertical support and extension members pivotally mounted to the longitudinal member, the extension members being mountable to the container. In an embodiment, the extension members are of an adjustable length. In an embodiment, the extension members comprise telescoping sub-members. In an embodiment, the extension members are pivotally mountable to the container. In an embodiment, the mounting elements comprise two brackets and wherein the container is mounted therebetween. In an embodiment, the mounting elements comprise a support member mounted to two opposite vertical surfaces, the container being mounted to the support member. In an embodiment, the container is moveably mounted to the support member.

In an embodiment, the container further comprises a mobile light system for illuminating the plants in the cultivation compartments.

In accordance with another aspect of the present invention there is provided a modular container for aeroponic and/or hydroponic cultivation of plants, the container comprising: at least one cultivating compartment for cultivating plants; a nutrient conduit for delivering a nutrient solution the at least one cultivating compartment; a water conduit for in communication with the at least one cultivating compartment, and mounting elements comprising a longitudinal member mountable to a vertical support and extension members pivotally mounted to the longitudinal member, the extension members being mountable to the container.

In accordance with a further aspect of the present invention, there is provided a modular container for aeroponic and/or hydroponic cultivation of plants, the container comprising: at least one vertical column comprising at least one cultivating compartment for cultivating plants; a vertical nutrient conduit for delivering a nutrient solution to each the at least one cultivating compartment; a vertical water conduit for draining water from the cultivating compartment, and mounting elements for mounting the container on a ceiling support.

In an embodiment, when the at least two like containers are vertically mounted on a vertical support with one container adjacently above another thereby respectively defining top and bottom containers, the respective nutrient and water conduits of the like containers being in fluid communication.

In an embodiment, the container further comprises a horizontal nutrient conduit at a top portion of the container the conduit in communication with the cultivating compartment. In an embodiment, when positioning a plurality of like the containers in an a adjacent side-to-side fashion the respective horizontal nutrient conduits of each the like container comprise open ends so as to be in fluid communication with each other.

In an embodiment, the mounting elements comprise a hook member. In an embodiment, the mounting elements comprise a top member mountable to the ceiling and pivotally mountable to the container. In an embodiment, the mounting elements further comprise a bottom member mountable to a floor and pivotally mountable to the container. In an embodiment, the top member is of adjustable length. In an embodiment, the mounting elements comprise a vertical member mounted to the ceiling and a floor, the container being mounted to the vertical member. In an embodiment, the container is moveably mountable to the support member.

In accordance with yet another aspect of the present invention there is provided mounting elements for a container for aeroponic or hydroponic cultivation of plants, the mounting elements comprising: a longitudinal member adapted to be mounted to the wall or ceiling surface; and extension members pivotally mounted to the longitudinal member, the extension members being adapted to be mounted to the container The term "conduit" should be construed herein to include without limitation a channel, a tube, a pipe, an elongate hollow member and the like of course all of these terms are interchangeable and used only for indicative purposes and not limitation. Furthermore, a conduit comprises a an aperture for providing fluid communication.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 14 is a lateral view of the container of FIG. 12.

FIG. 15 is a perspective view of various aeroponic/hydroponic containers in accordance with an embodiment of the present invention;

FIG. 16b is a side sectional view of the container of FIG. 16a;

FIG. 16c is a front elevation view of the container of FIG. 2a;

FIG. 17 is a perspective view of two aeroponic/hydroponic containers mounted to a wall surface via movable mounting elements, in accordance with another embodiment of the present invention;

FIGS. 21a to 21d are perspective views of a mobile lighting system in accordance with a still further embodiment of the present invention.

DESCRIPTION OF ILLUSTRATIVE EMBODIMENTS

The present invention is illustrated in further details by the following non-limiting examples.

Figure 1:
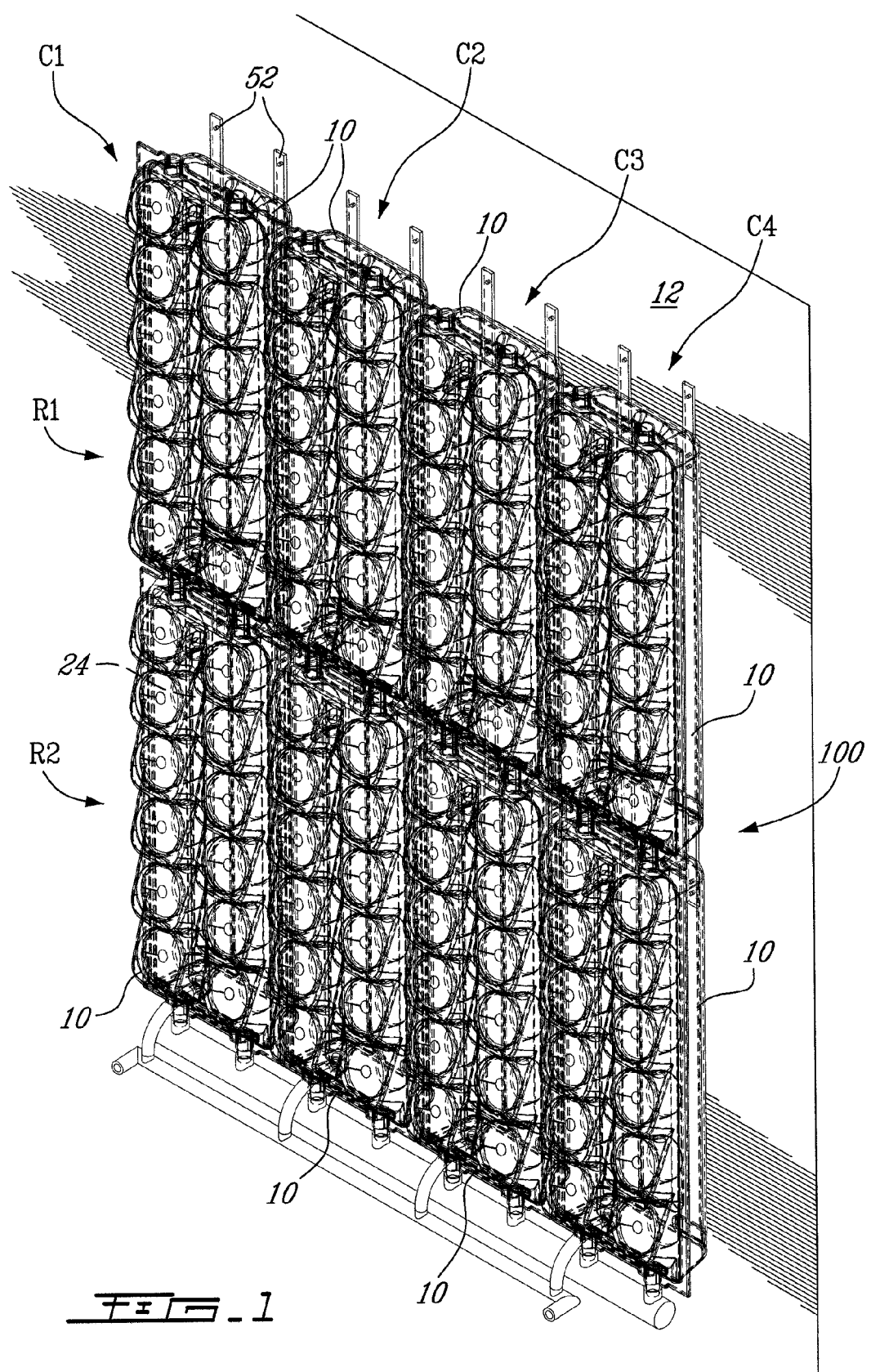
FIGS. 1 and 2 are perspective views of a plurality of modular containers mounted to a wall surface in accordance with an embodiment of the present invention.
Figure 2:
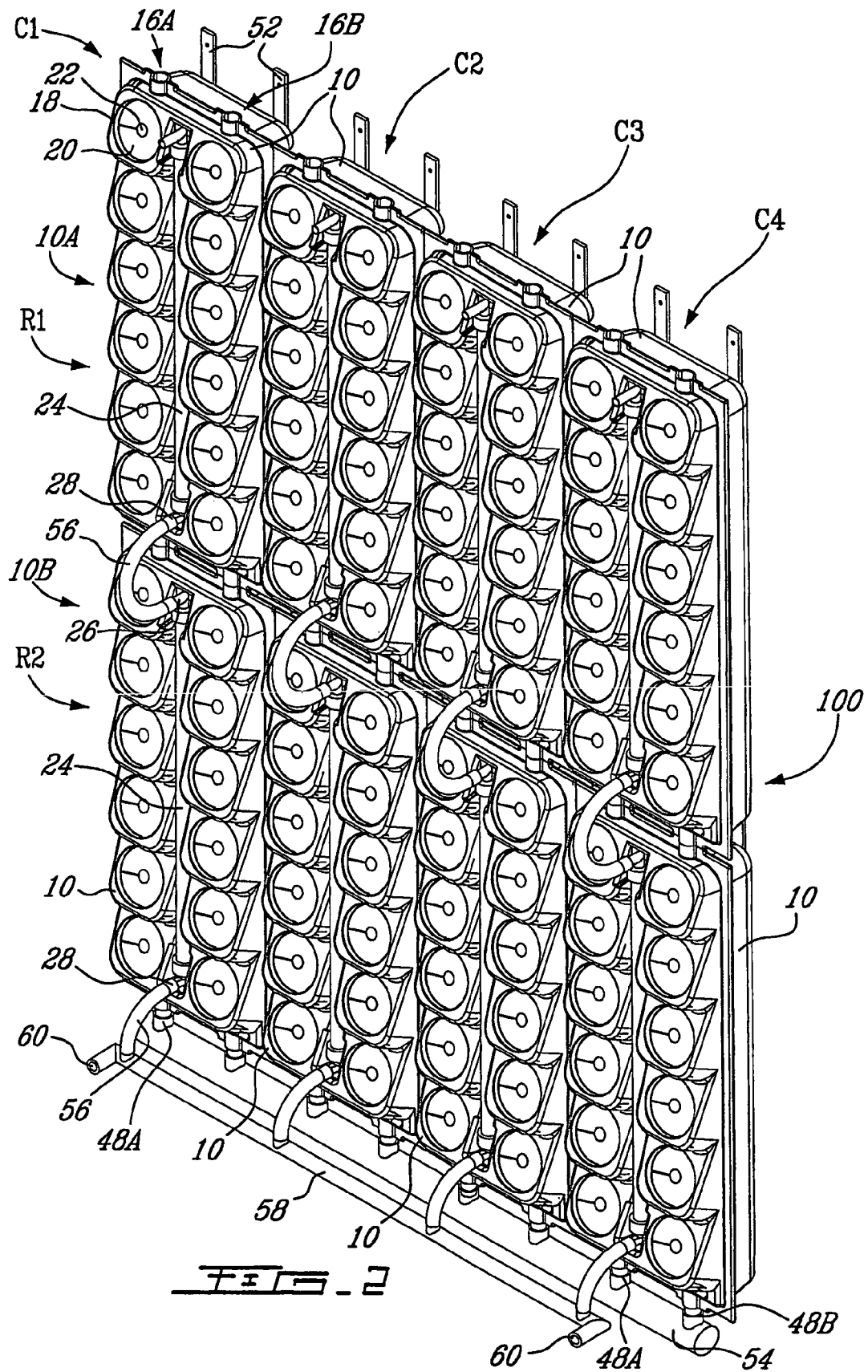

FIGS. 1 and 2 show a plurality 100 of modular containers 10 for hydroponic or aeroponic cultivation mounted to a wall 12.

Figure 3:
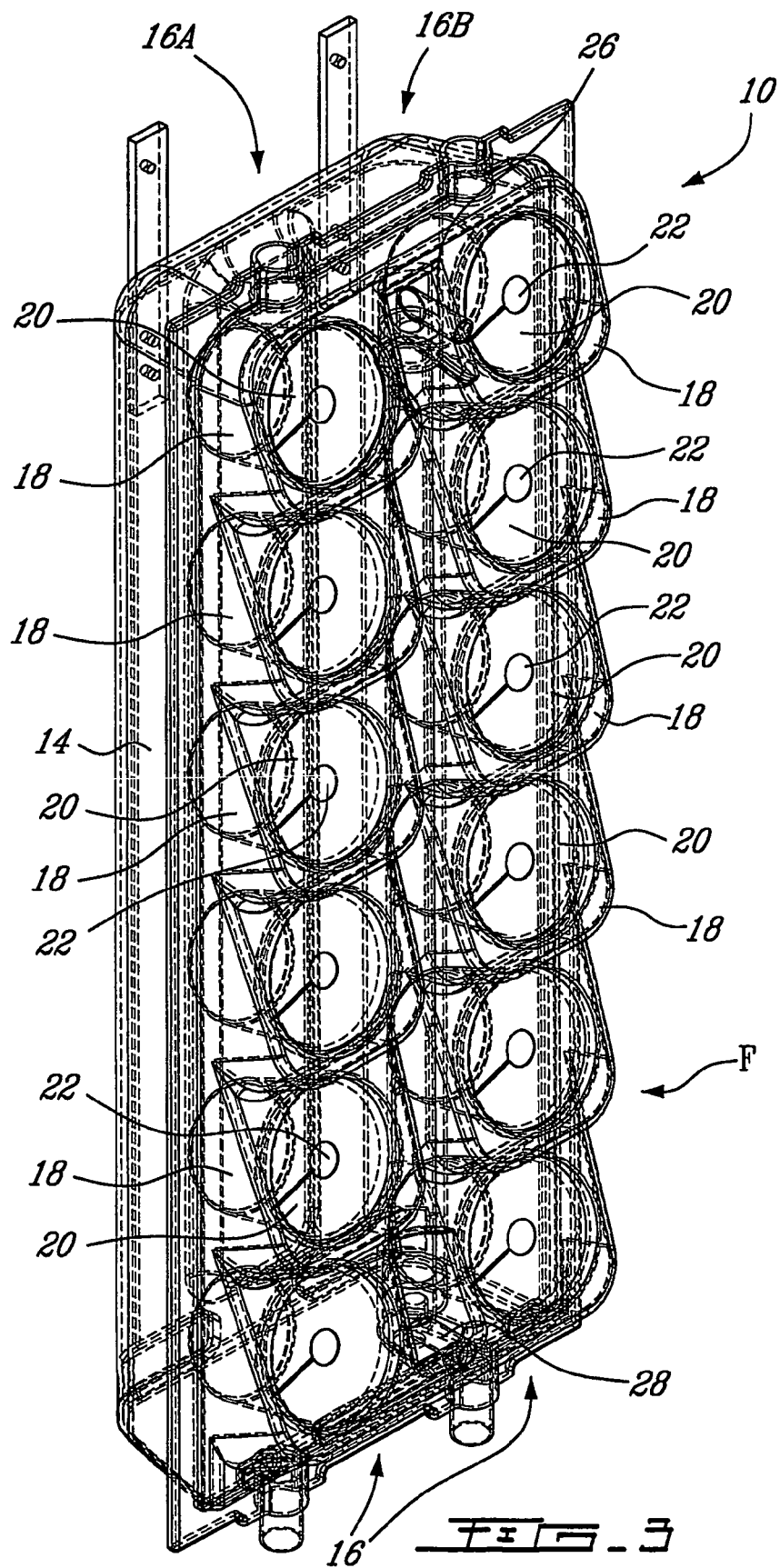
FIG. 3 is a perspective view of a modular container in accordance with an embodiment of the present invention.
Figure 4:
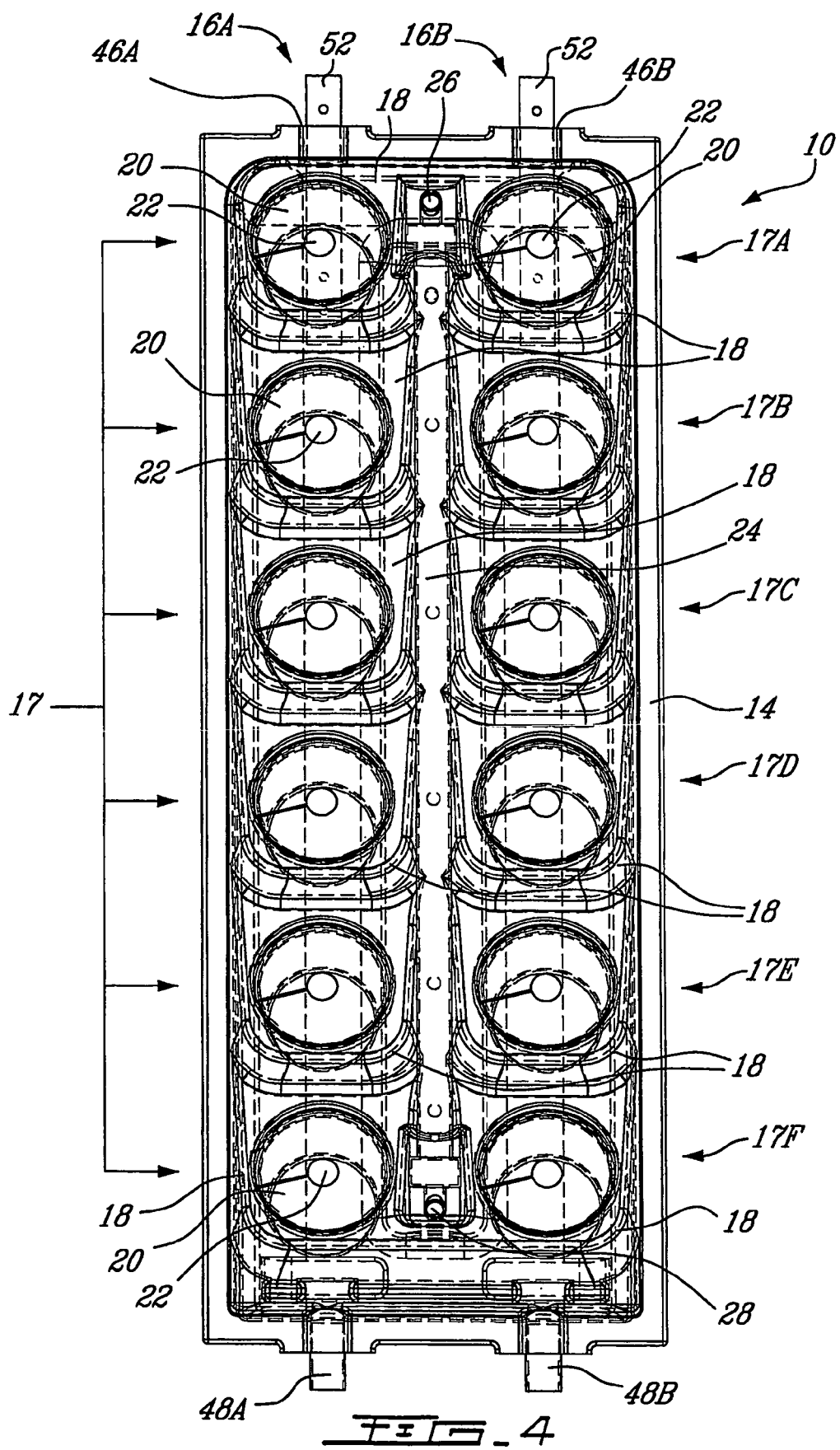
FIG. 4 is a front elevation view of the modular container of FIG. 3.
Figure 5:
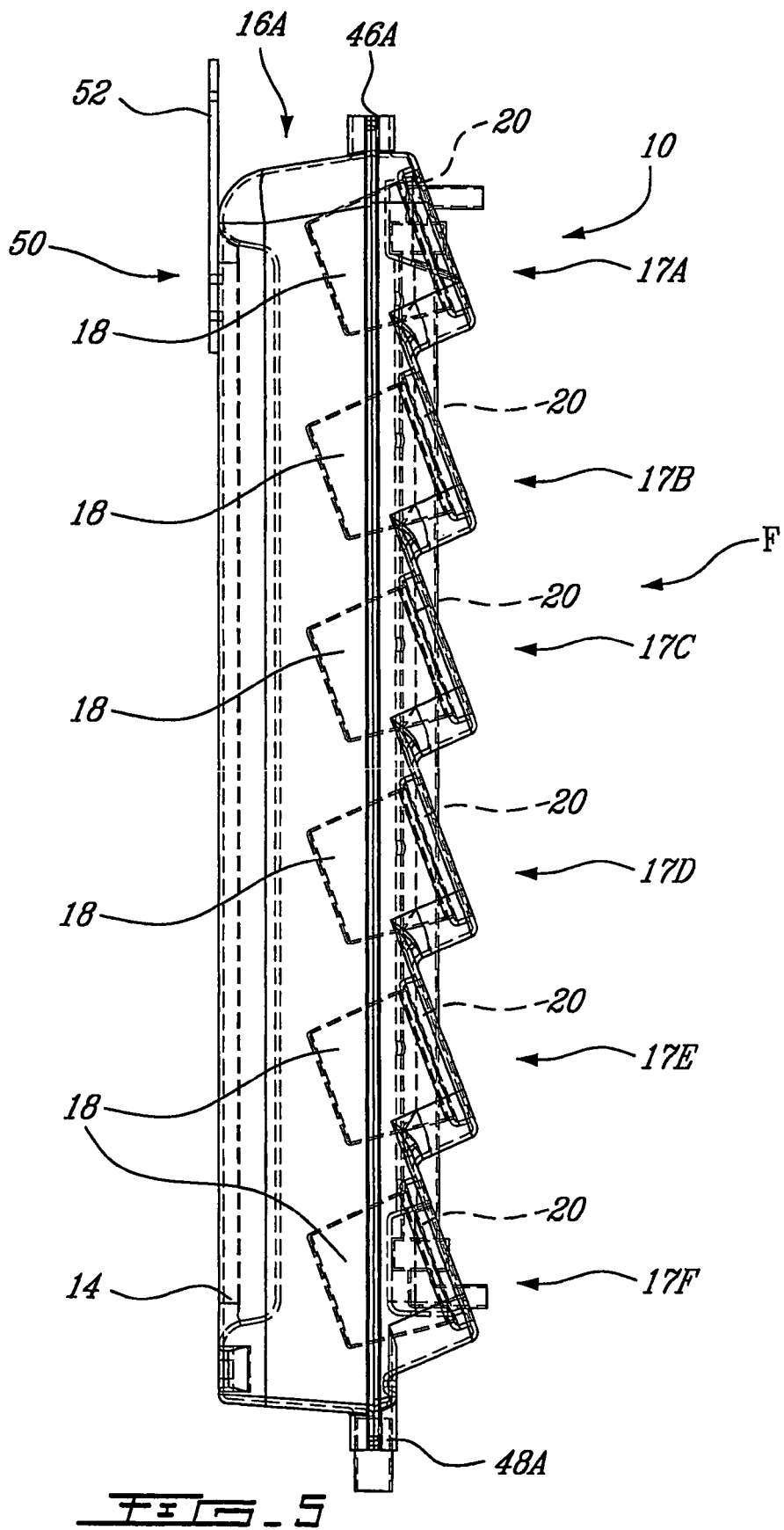
FIG. 5 is a lateral view of the container of FIG. 3.

With reference to FIGS. 3, 4 and 5, container 10 has an enclosed body 14. Body 14 includes a plurality of columns 16, with each column 16 having a plurality of rows 17 including cultivation compartment or pot 18. In this not limiting example, there are two columns 16A and 16B and six rows 17A, 17B, 17C, 17D, 17E, and 17F. Each compartment 18 includes a removable front cover 20 having an aperture 22 for allowing the plant to grow therethrough. The plants receive light via aperture 22 and may grow through this aperture 22. Each compartment 18 is inclined at an angle so as to receive light at a predetermined angle.

A nutrient conduit such as distribution tube 24 is positioned between two adjacent columns 16A and 16B and includes an intake tube 26 and an outtake tube 28 which respectively define intake and outtake apertures.

Figure 6:
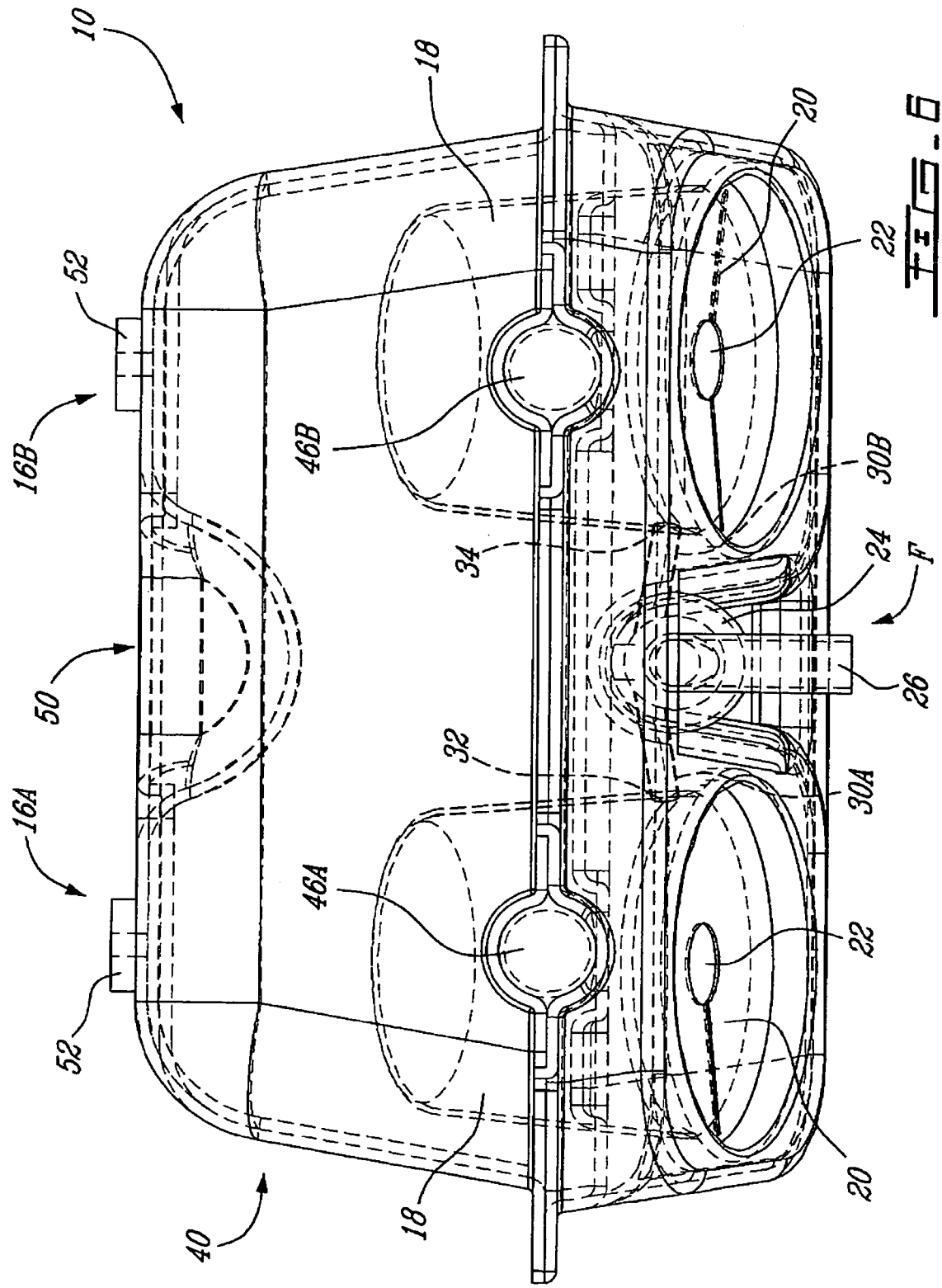
FIG. 6 is a top plan view of the container of FIG. 3.

As better shown in FIG. 6, the distribution tube 24 comprises a plurality of auxiliary conduits in the form of tubes 30A and 30B for each column 18A and 20B respectively in order to feed the adjacent compartments 18 of each row 17A, 17B, 17C, 17D, 17E, and 17F of. The auxiliary tubes 30A and 30B are inserted through openings in order to distribute a nutrient solution to each compartment or pot 18. In another embodiment shown in FIG. 7, the central distribution tube 24 comprises outer auxiliary feeding tubes 36A and 36B which distribute nutrients to each compartment 18 via an intake aperture 38 in cover 20. As will be explained herein, tubes 30A and 30B comprise pulverizing members with nozzles at their ends as will be understood by the skilled artisan, and tubes 36A and 36B comprise irrigation members.

Figure 7:
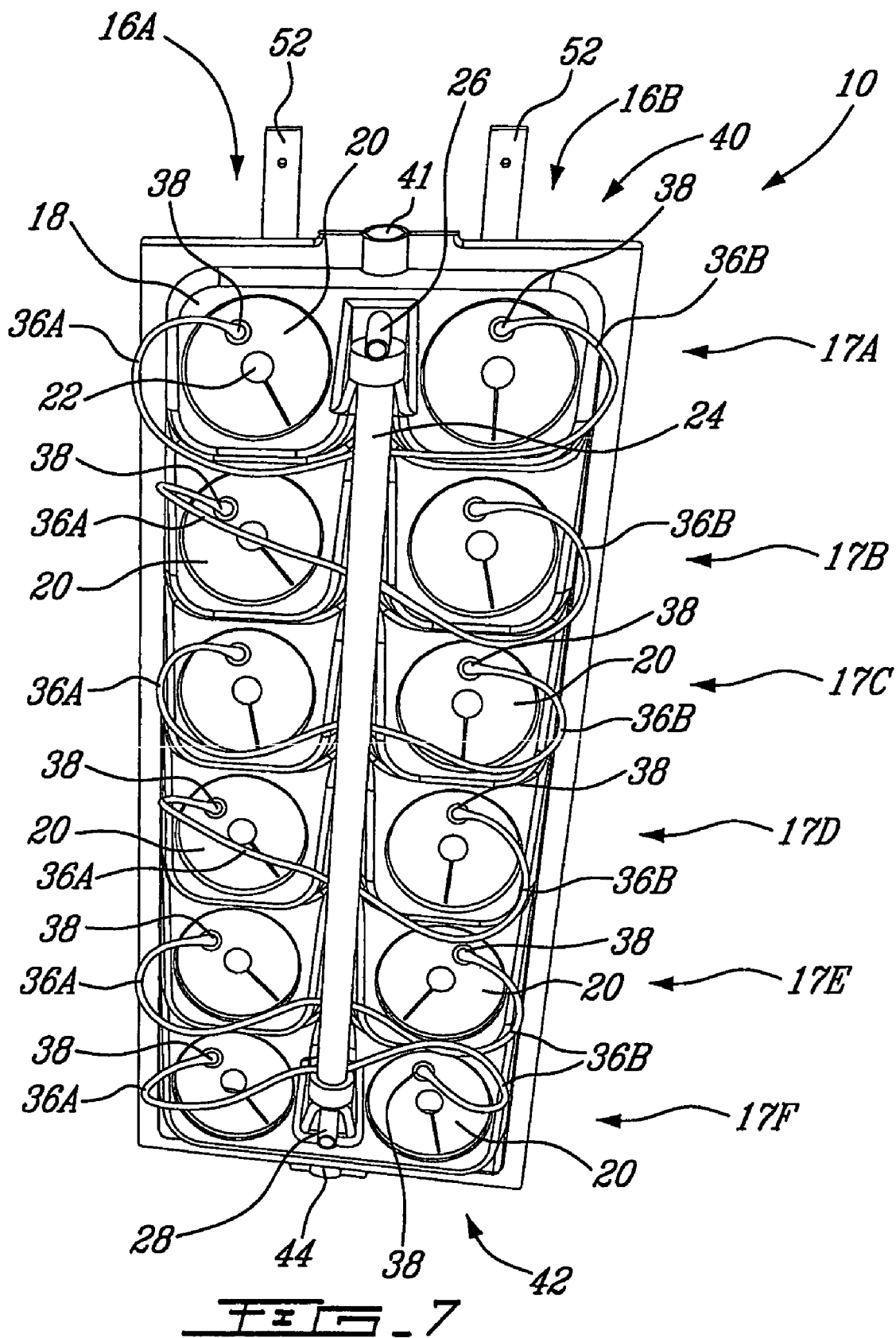
FIG. 7 is a front elevation view of a container in accordance with another embodiment of the present invention.

The skilled artisan will appreciate that the container 10 comprises water conduit in communication with compartments 18. In this respect, the container 10 includes at the top portion 40 thereof an intake channel 41 which in the embodiment shown in FIG. 7 is in the form of a single tube which divides into secondary tubes (not shown) for each column 16A and 16B. In this illustrated embodiment, the container 10 includes at the bottom portion 42 thereof a drainage channel 44 in the form of a single receiving tube which is a meeting point of two tubes (not shown) emanating from each column 16A and 16B. In another embodiment shown in FIGS. 3, 4 and 5 and particularly in FIG. 8 there are two separate intake conduits such tubes 46A and 46B defining respective intake apertures and two separate outtake conduits in the form draining tubes 48A and 48B defining respective outtake apertures for each column 16A and 16B respectively.

The rear side 50 of the container body 14 includes mounting elements such as support members 52. The support members 52 are elongate bodies configured to mount a container 10 onto a vertical surface such as a wall 12 for example.

Hence in operation, the modular containers 10 provide for a hydroponic method in which internal auxiliary tubes 30A and 30B will pulverize water as well as air and nutrients at about equal amounts on the plant roots or by drop irrigation system where water flows directly onto the roots of the intermittent continuous irrigation via auxiliary tubes 36A and 36B.

Therefore the modular containers 10 can be mounted on a wall surface 12 for example. The plurality 100 comprises adjacent modular container 10 placed in rows R1 and R2 and columns C1, C2, C3 and C4.

As shown in FIGS. 1 and 2, a plurality 100 of containers 10 can be mounted in a top down adjacent fashion hence the draining tubes 48A and 48B of a top container 10A will drain water into the intake tubes 46A and 46B of a bottom container 10B hence allowing water to flow through columns 16 from a top container 10A to a bottom container 10B until it reaches the bottommost container for evacuation via bottom evacuation pipe 54.

The distribution tubes 24 of the plurality 100 communicate via short tubes 56 which link the outtake portions 28 of a top container 10A with the intake portions 26 of a bottom container 10B, the short tubes 56 then link the bottommost container 10B with a receiving pipe 58 having exit portions 60.

The fact that the distribution tube 24 is placed on the front side F between two adjacent columns 16A and 16B provides for the user to easily remove it or replace it or unblock it, if such a problem arises. Furthermore the modular aspect of the containers 10 provide for creating a decorative wall surface.

The removable covers 20 allow the users to have easy access to the plants for removing or placing them into or out of the compartments 18.

Figure 8:
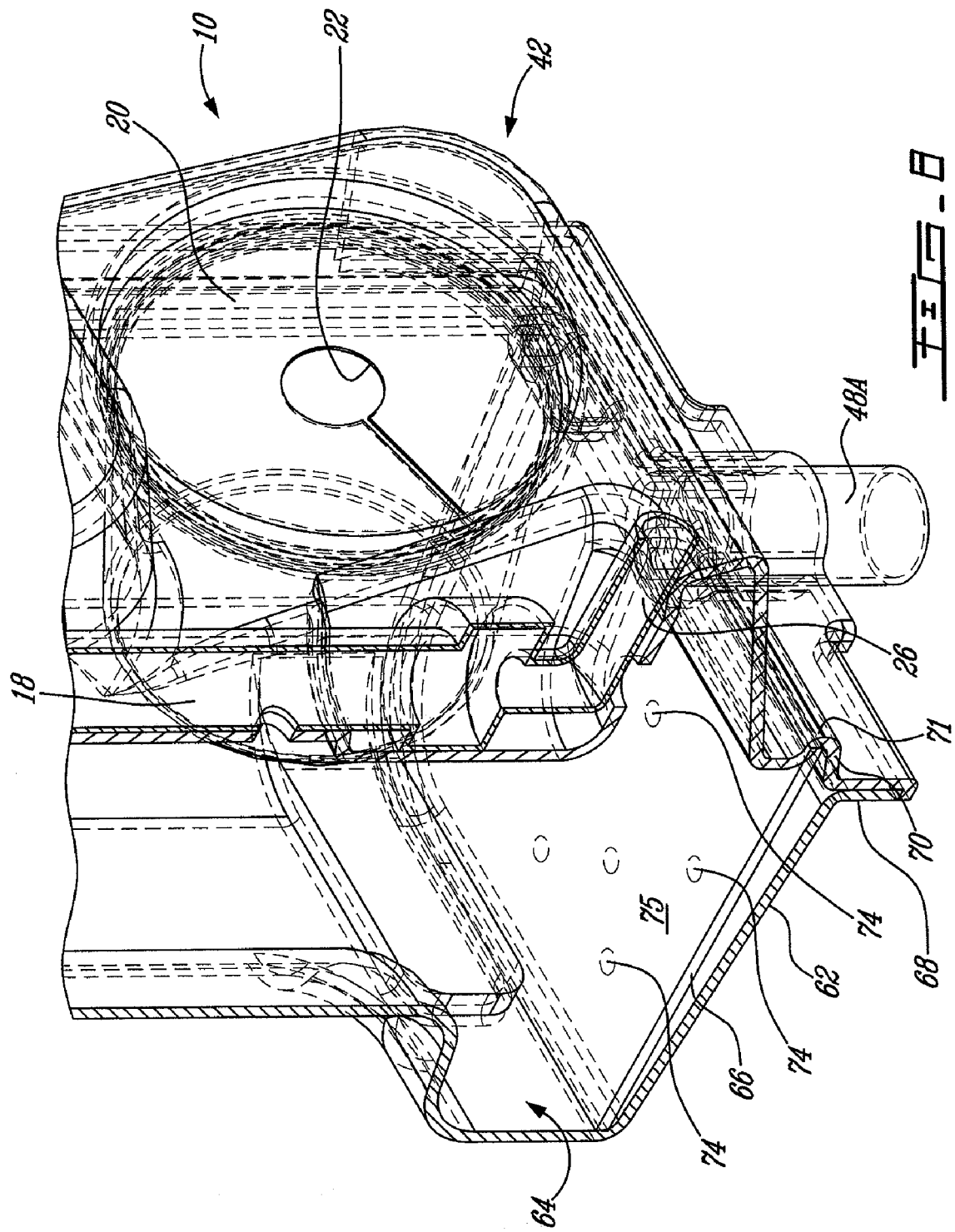
FIGS. 8 and 9 are partial perspective views of the bottom portion of the modular container of FIG. 3.
Figure 9:
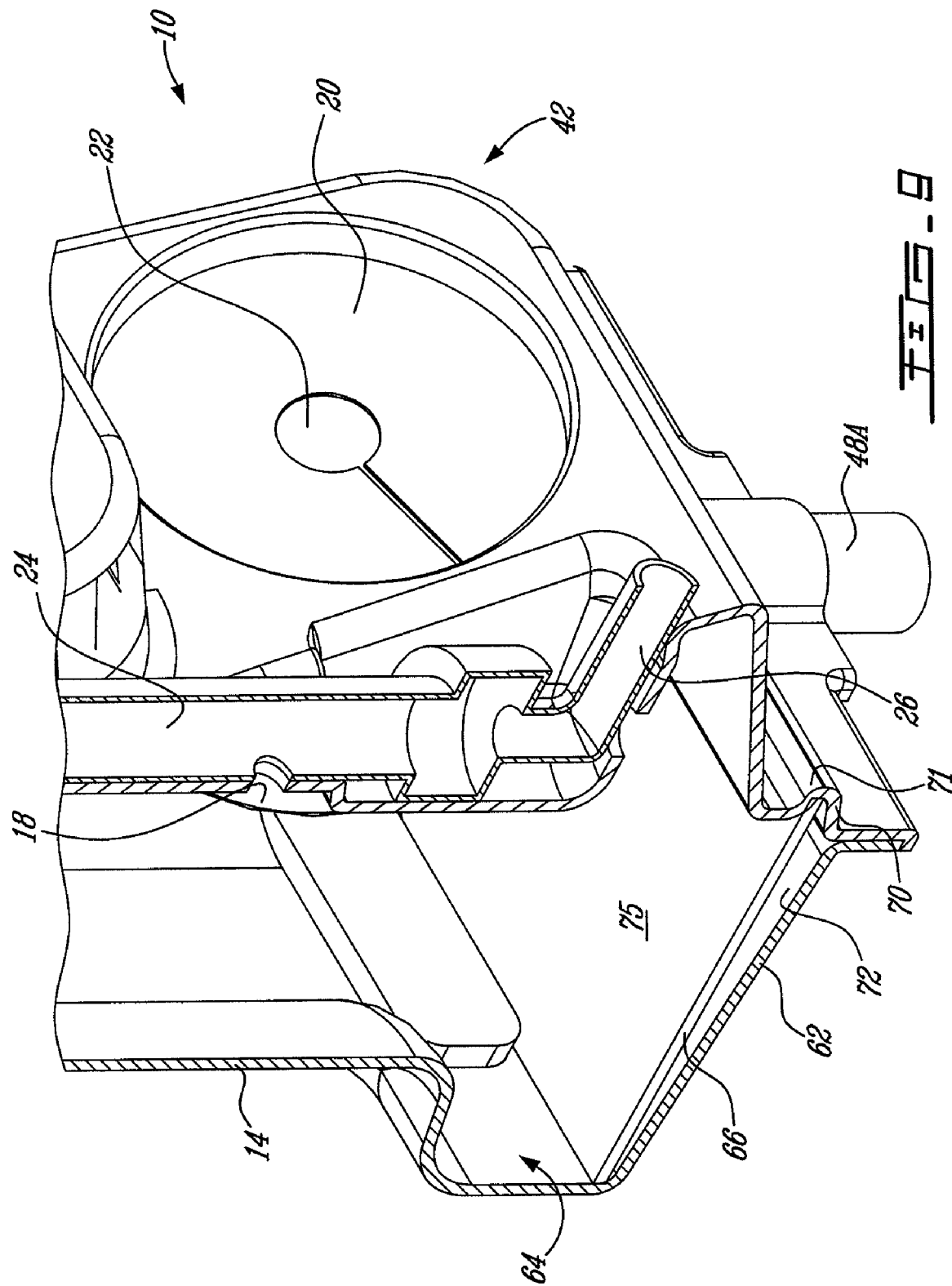

With respect to FIGS. 8 and 9, the bottom portion 42 of container 10, includes a bottom closed end wall 62 which encloses a chamber 64 defined by the hollow body 14. A membrane 66 is placed near the closed end 62 and is wedged between a rear body wall 68 and front indentation 70 formed in the front wall 71. In this way, the membrane 66 and the closed end wall 62 define a cavity 72 which can be used as a waste compartment free of roots. The membrane 66 may be made of plastic material including perforations 74 and is covered with geodesic tissue 75. The membrane 66 substantially acts as a strainer for blocking roots or parts thereof or other materials from getting through the membrane perforations 74 since they are shielded by the geodesic tissue 75 and allowing the passage of water through the geodesic tissue 75 and perforations 74 into the compartment cavity 72 and through the drainage tube 48A or 48B thereby substantially avoiding clogging these tubes 48A or 48B.

Figure 10:
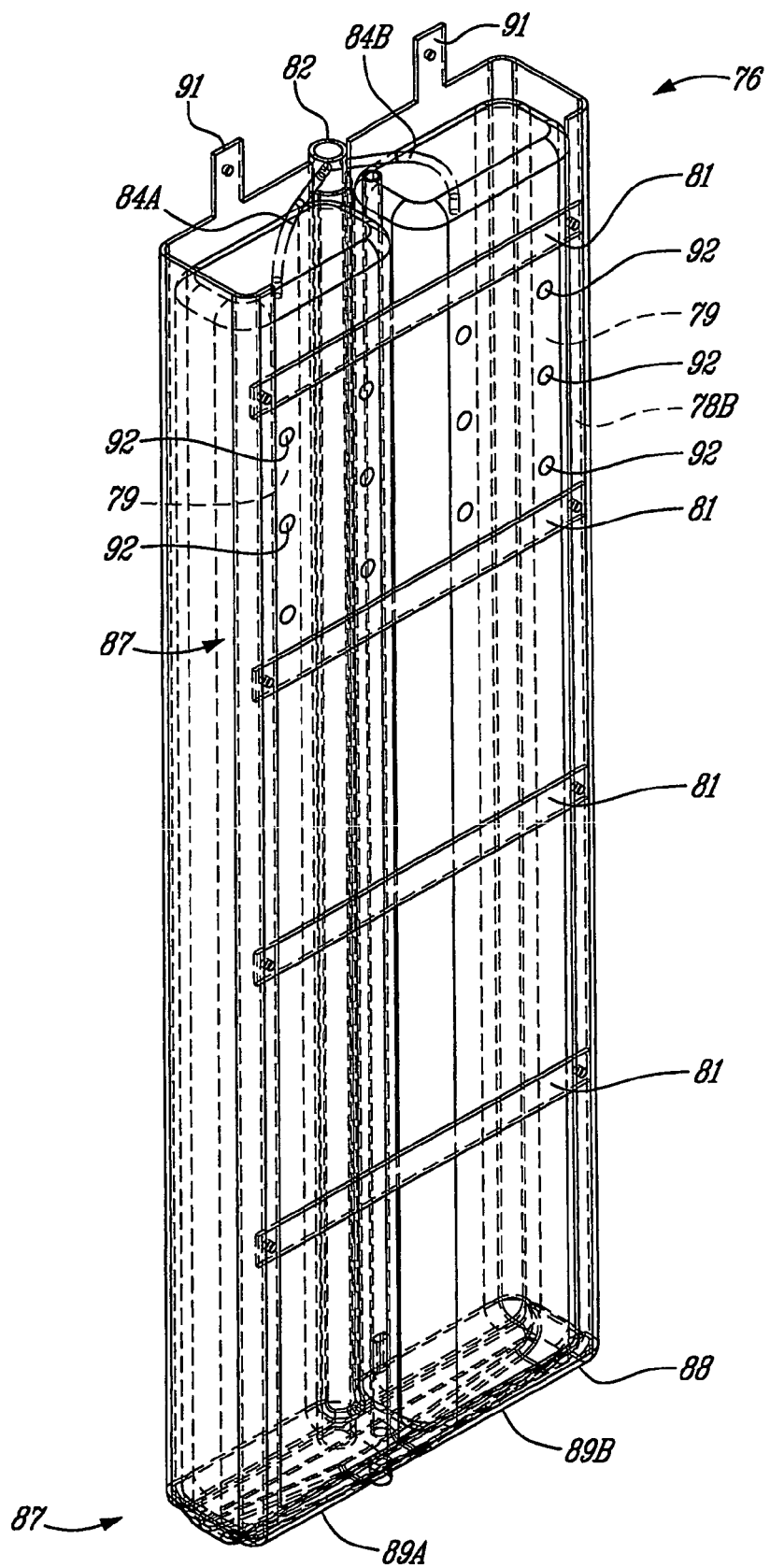
FIG. 10 is a perspective view of a modular container in accordance with another embodiment of the present invention.
Figure 11:
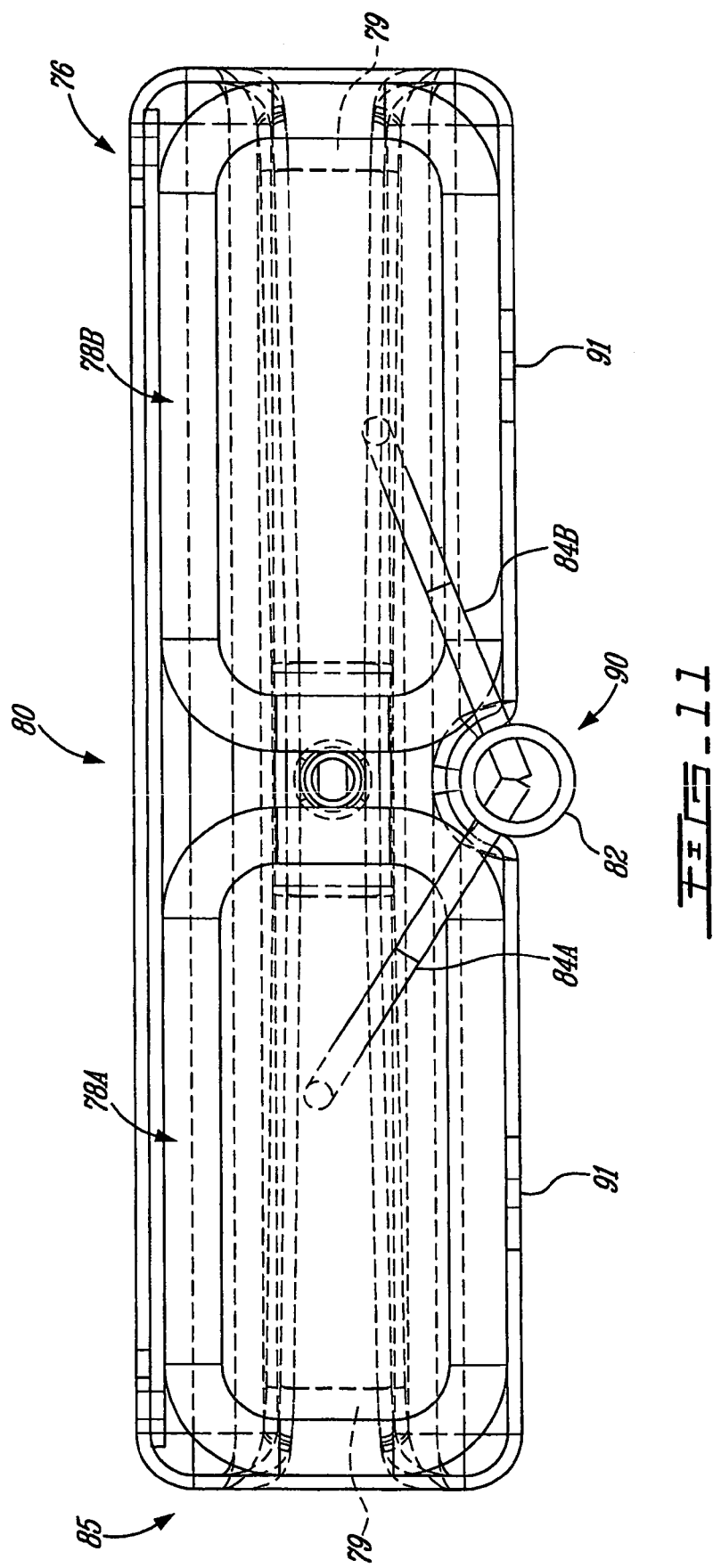
FIG. 11 is a top plan view of the container of FIG. 10.

In another embodiment shown in FIGS. 10 and 11, a modular container 76 is illustrated having two side-by-side longitudinal compartments 78A and 78B for receiving a respective a substrate such as rock-wool breads 79 therein. The front face 80 of the container 76 is opened and includes retaining brackets 81 which hold the rock-wool breads 79 in place. A distribution tube 82 is positioned between the compartments 78A and 78B of the container 76 and includes two auxiliary distribution conduits 84A and 84B at the top portion 85 of the container 76 for distributing nutrient solution into the top portion 86 of the rock-wool breads 79. The bottom portion 87 of the container 76 includes a draining receptacle 88 as well as two draining portions 89A and 89B for each compartment 78A and 78B. The rear side 90 of the modular container 76 contains support members 91 for mounting the container onto a vertical surface as explained above for container 10.

Therefore during operation, nutrient solution will flow from the auxiliary conduits 84A and 84B downwards and though the rock-wool breads 79. In order to feed the plants which have been inserted therein via making perforations 92 in the rock-wool breads 79. This solution will flow by gravity downwards into the receptacle draining 88 and flow outwards via the draining portions 89A and 89B. As mentioned before, the containers 76 are modular and hence a series can be placed in a top down column on a vertical surface the bottom draining tubes 89A and 89B will therefore be in contiguity with top portion 85 of a bottom adjacent container 76 until it reaches the bottommost container drainage tube 89A and 89B for evacuation thereof.

Figure 12:
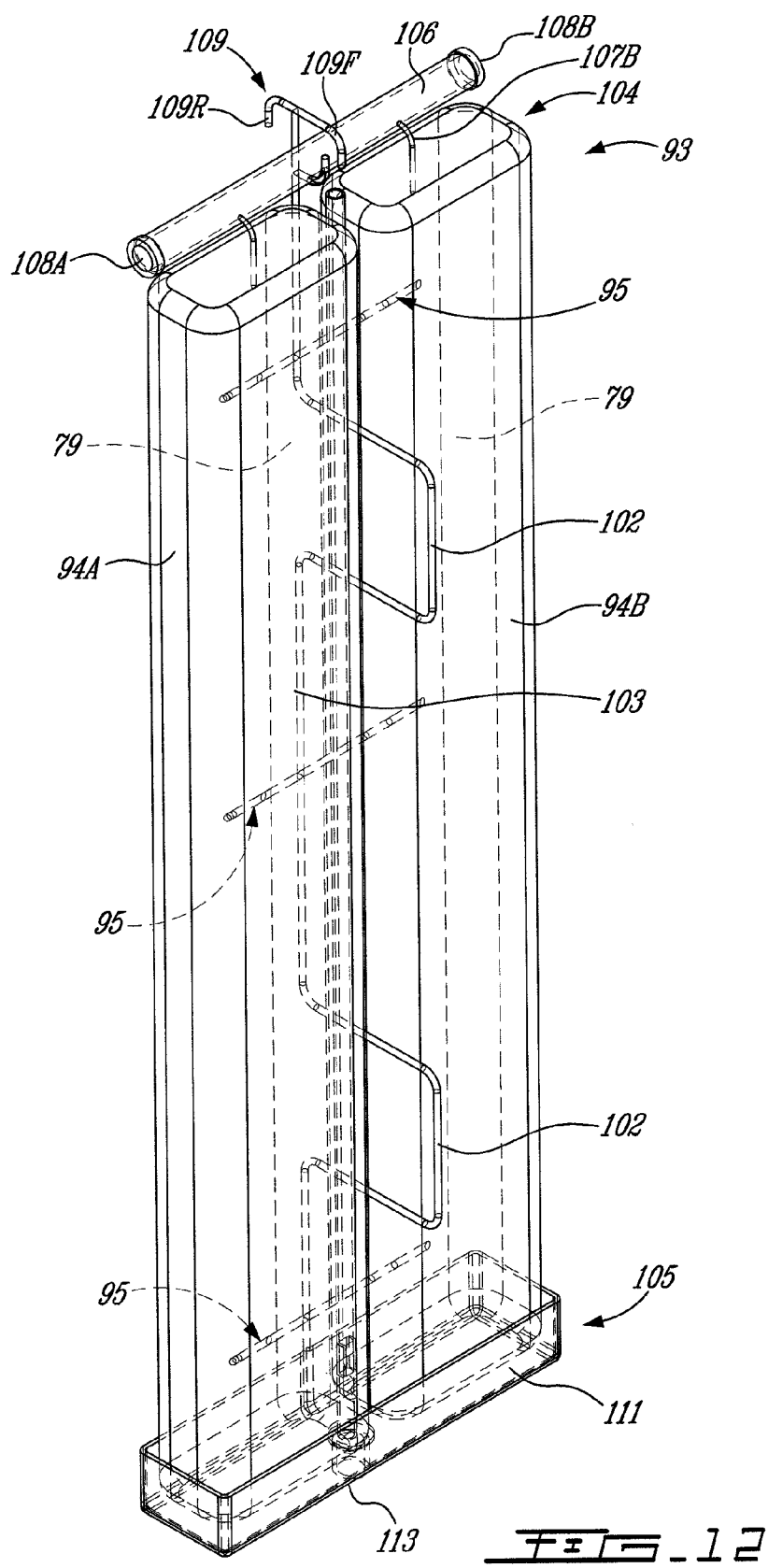
FIG. 12 is a perspective view of a modular container in accordance with a further embodiment of the present invention.
Figure 13:
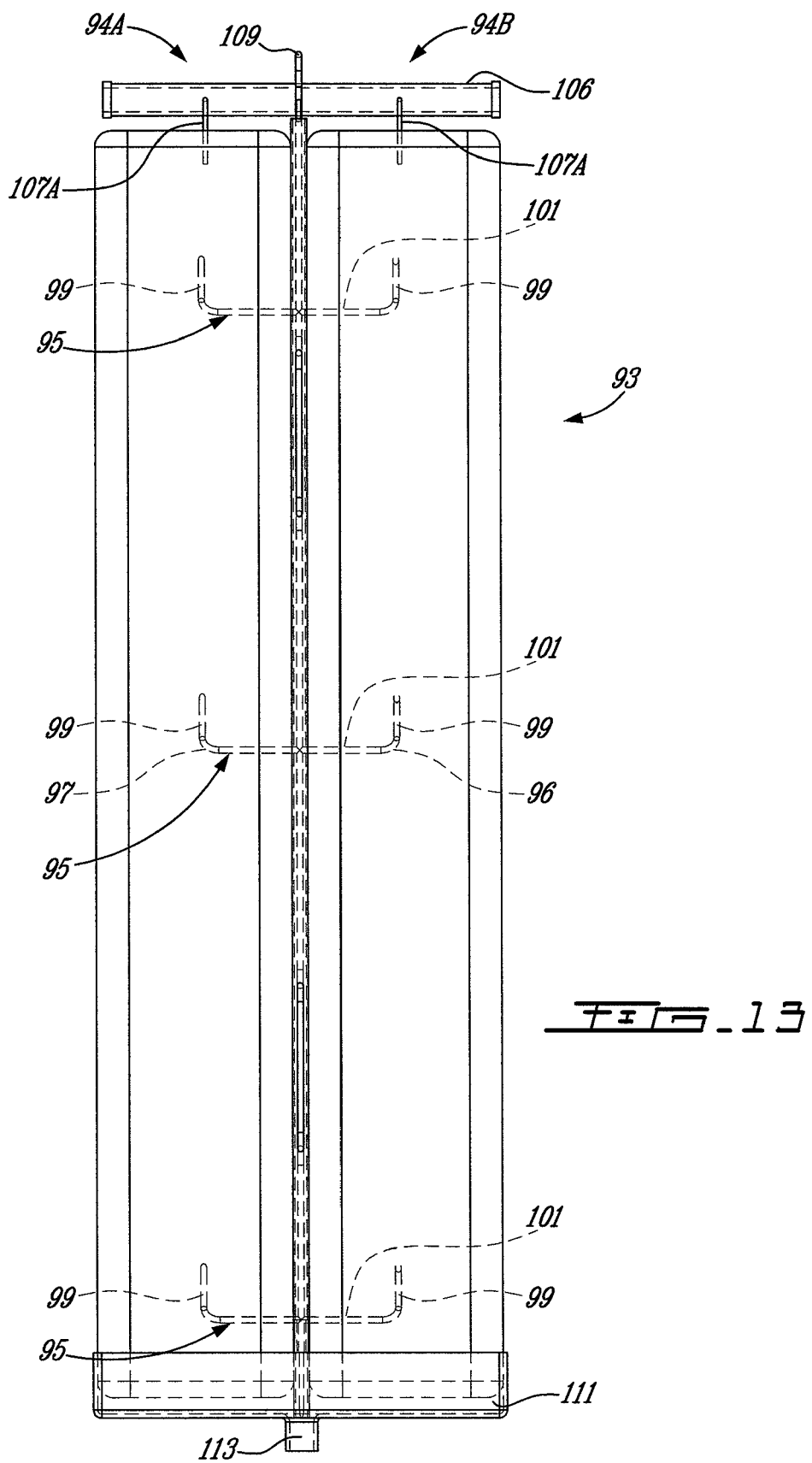
FIG. 13 is a front elevation view of the container of FIG. 12.

In another embodiment, shown in FIGS. 12, 13 and 14, a container 93 is illustrated having two compartments 94A and 94B for receiving rock-wool breads 79.

In this embodiment the retaining member is in the form of a staple 95 that is pierced through the rock-wool breads and includes free ends 96 and 97 that are removably locked into the back panel 98 of container 93. The staple 95 has two piercing fingers 99 which are inclined for better retention of the rock-wool breads 79 and which are contiguous with a common horizontal portion 101 therebetween.

The container 93 includes handles 102 for handling thereof. These handles 102 are formed by a stem 103 which runs from the top portion 104 all the way to the bottom portion 105 of the container 93 and is so bent as to form protruding U-shaped structures thereby defining handles members 102.

At the top portion 104 of the container 93 there is a main distribution conduit 106 which is horizontally placed and spanning the width of both longitudinal compartments 94A and 94B. The distribution conduit 106 includes two auxiliary distributors 107A and 107B which distribute nutrient solution in each compartment 94A and 94B respectively in the same manner as described above for containers 10 and 76. The main distribution conduit 106 has opened lateral ends 108A and 108B therefore allowing to place a plurality of such containers 93 in a side-by-side continuous fashion with solution flowing across one distribution conduit tube 106 to the next in a contiguous fashion.

Again, at the top portion 104 of the container 93 there is a mounting element 109 in a form of a double hook having a rear hook 109R and a front larger hook 109F in order to suspend the container 93 from a suspension element on a ceiling portion. The bottom portion 105 of the container 93 includes a draining receptacle 111 as well as a drainage channel 113 for evacuating the solution that flows trough the rock-wool bread top part 104 all the way to the bottom 105 part during irrigation. The front faces 115 of the compartments 94A and 94B are opened allowing the user to pierce holes 92 in the rockwool breads and place plants therein.

FIG. 15 illustrates a variety containers 110, 120, 130, 140, 150, 160, and 170, according to other non-limiting embodiment, for aeroponic and hydroponic cultivation of plants. The containers of the present invention can be provided in a variety of lengths, sizes and configurations, as shown by the non-limiting examples herein.

Turning now to FIGS. 16a to 16d, only the particular embodiment 140 will be described for concision purposes. It should be noted that containers 110, 120, 30, 140, 150, 160, and 170, as well as further containers 80, 90, 180, 190 and 100 (see FIGS. 3, 4, and 6 respectively) are similarly constructed.

Figure 16A:
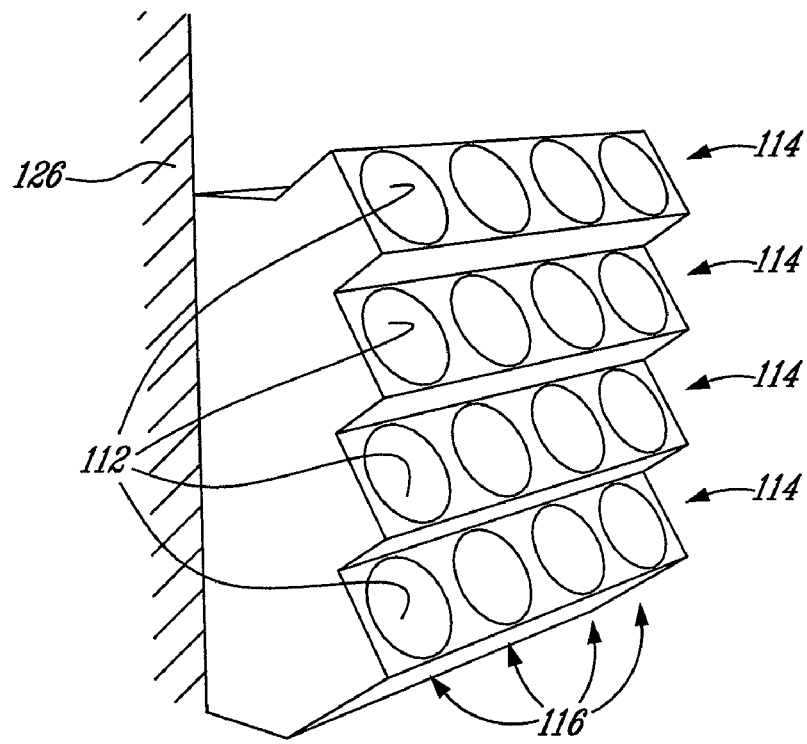
FIG. 16a is a perspective view of one of the aeroponic/hydroponic containers of FIG. 2.
Figure 16B:
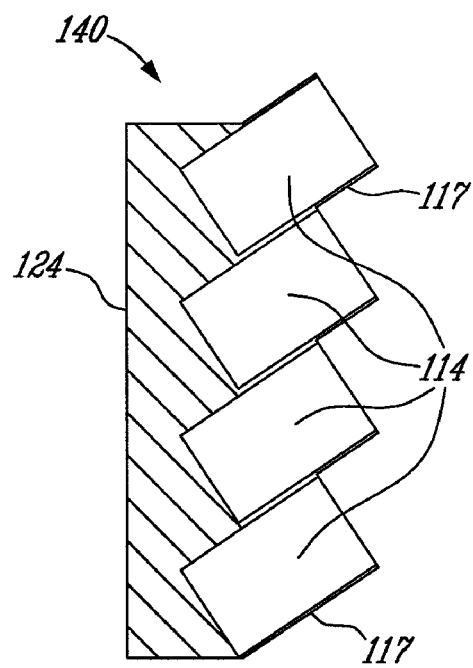
Figure 16C:
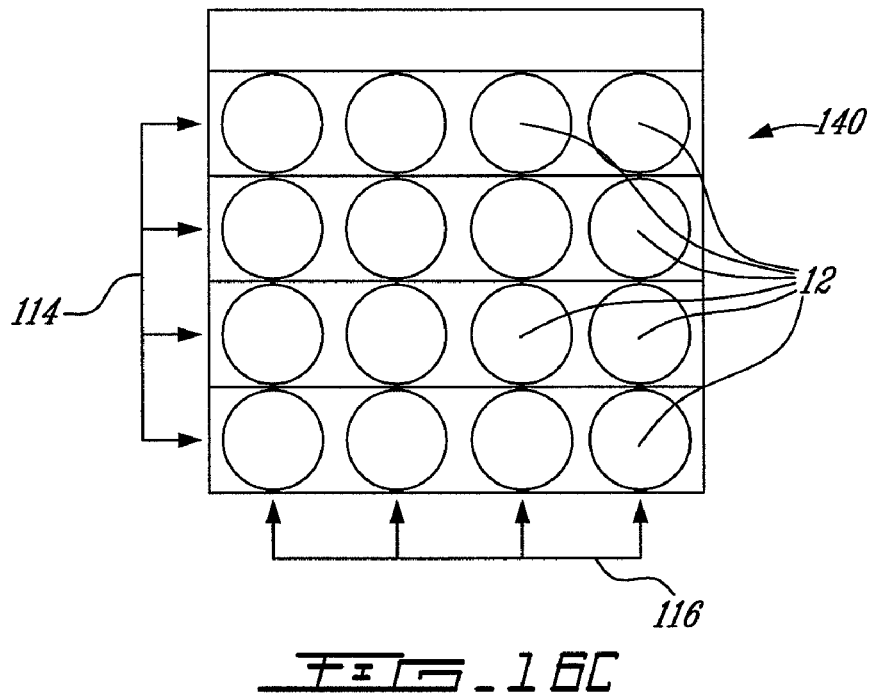
Figure 21A:
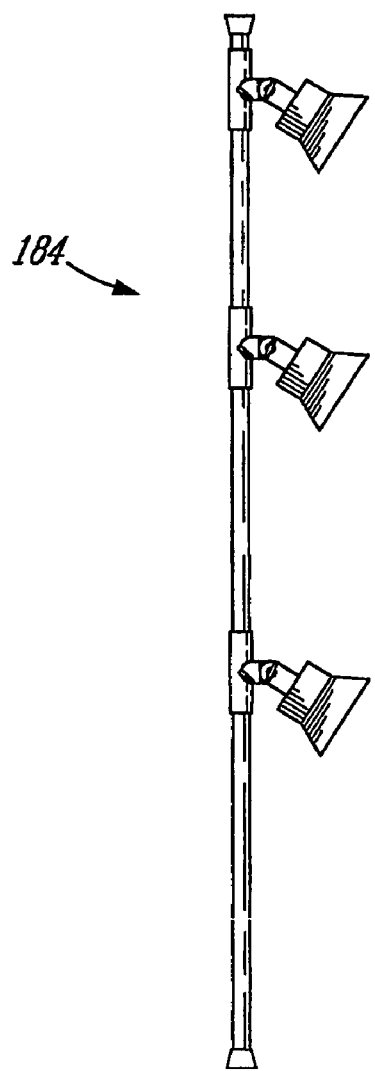
Figure 21B:
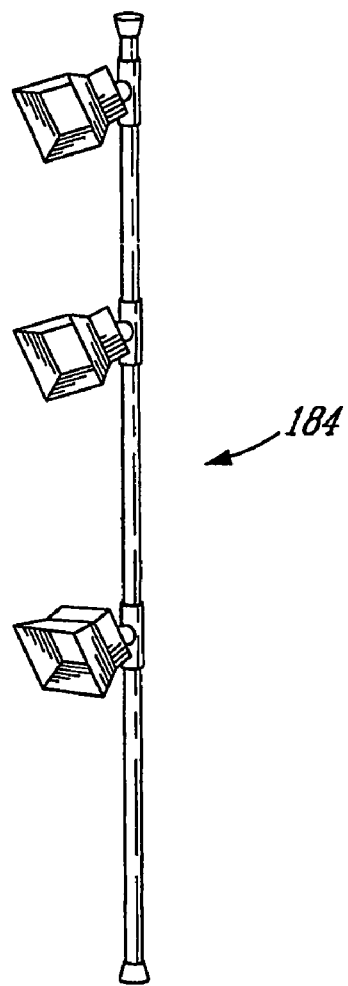

FIG. 16a shows the container 140 including cultivating compartments 112 which are arranged in a series of rows 114 and columns 116, as more clearly shown in FIG. 16c. Turning to FIG. 16b, the compartments 112 extend at an upward angle. In a non-limiting embodiment, this angle is around 45°. A variety of plants can be placed into the cultivating compartments 112. It should also be noted that each bottom surface 117, as shown in FIG. 16b, of a top row 114 can be used as a partial cover for a plant in a bottom row 114 in order to aid in the incubating process. This particular arrangement of the rows 114 provides for lights to be directed downward at an angle, as shown in FIGS. 21a, 21b, and 21c, hence facilitating the illumination of the plants.

Figure 16D:
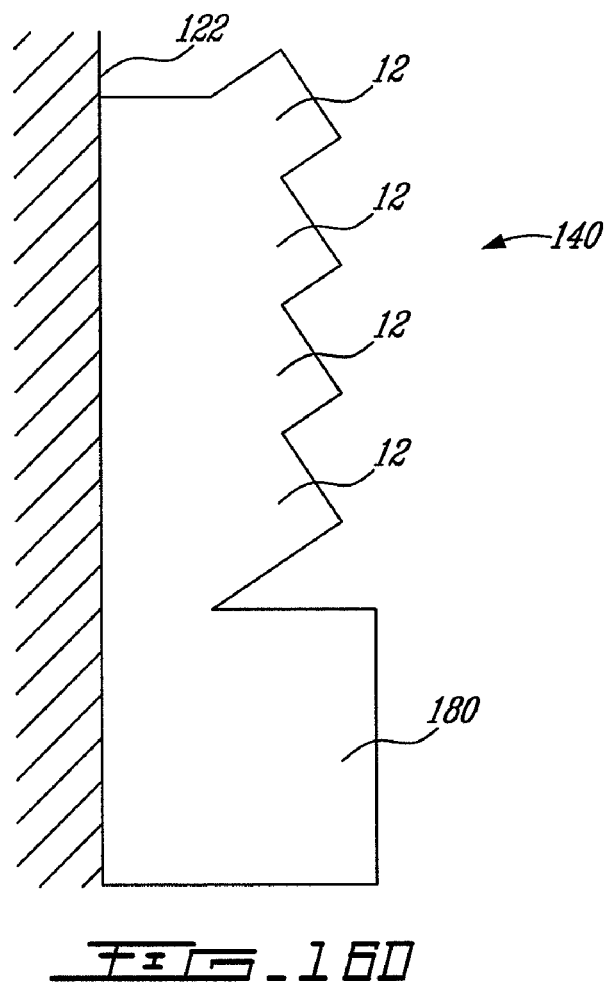
FIG. 16d is a side view of the container of FIG. 2a, shown atop a reservoir.

As shown in FIG. 16d, the containers of the invention include a reservoir 118 for water and nutrients. As will be easily understood by the skilled artisan, a variety of conduits (not shown for these embodiments) from the reservoir 118 to each row 114 can be provided in order to bring water and nutrients to each plant in a cultivating compartment 112. Turning again to FIG. 16a, the back surface 122 (better shown in FIGS. 16b and 16d) comprises fasteners 1-24 shown in FIG. 16b for fastening the container 140 to a wall surface 126, as shown in FIG. 16a.

Turning to FIG. 16c, the container 140 may include a top Cover 141 which can partially cover the rows 114 of cultivating compartments 112 in order to provide for incubation of the various plants that are being cultivated.

FIG. 17 shows a perspective view of two containers 180 in accordance with an embodiment of the invention. These containers 180 include mounting elements 128.

Figure 18B:
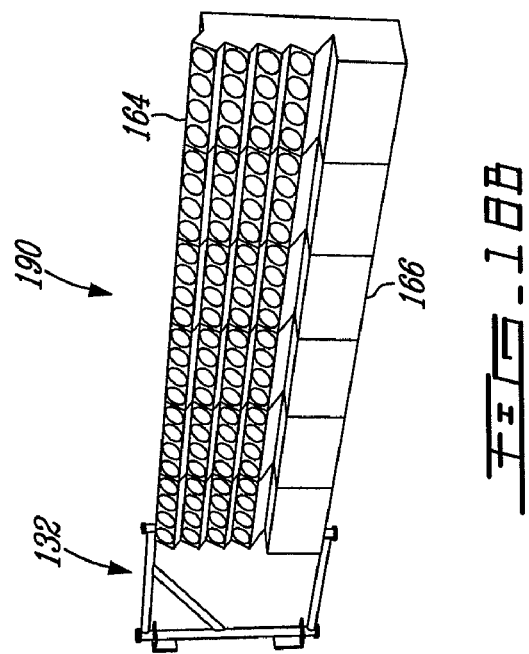
FIG. 18 is a perspective view of two aeroponic/hydroponic containers in accordance with another embodiment of the present invention mounted to a wall surface via mounting elements.
Figure 18A:
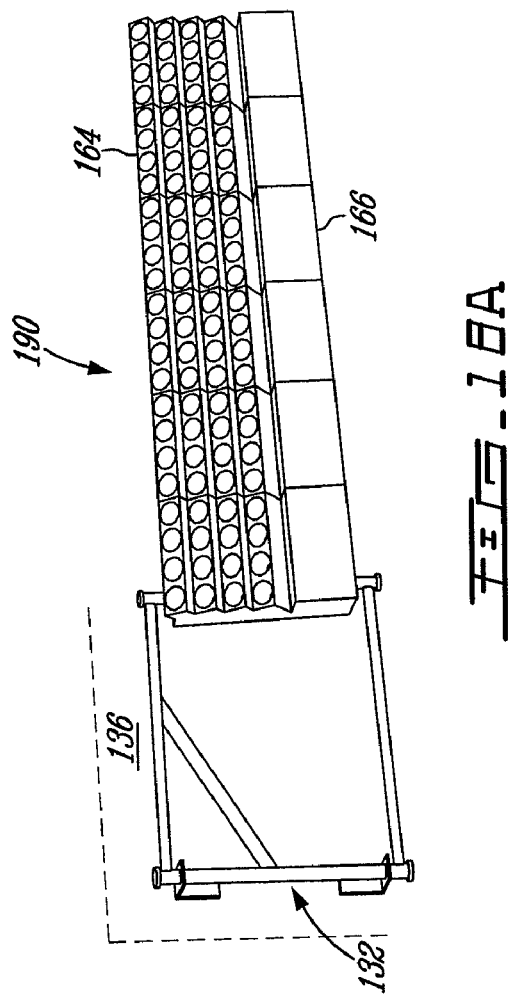

FIG. 18 shows two containers 190 in accordance with an embodiment of the present invention. These containers include mounting elements 132.

Figure 19:
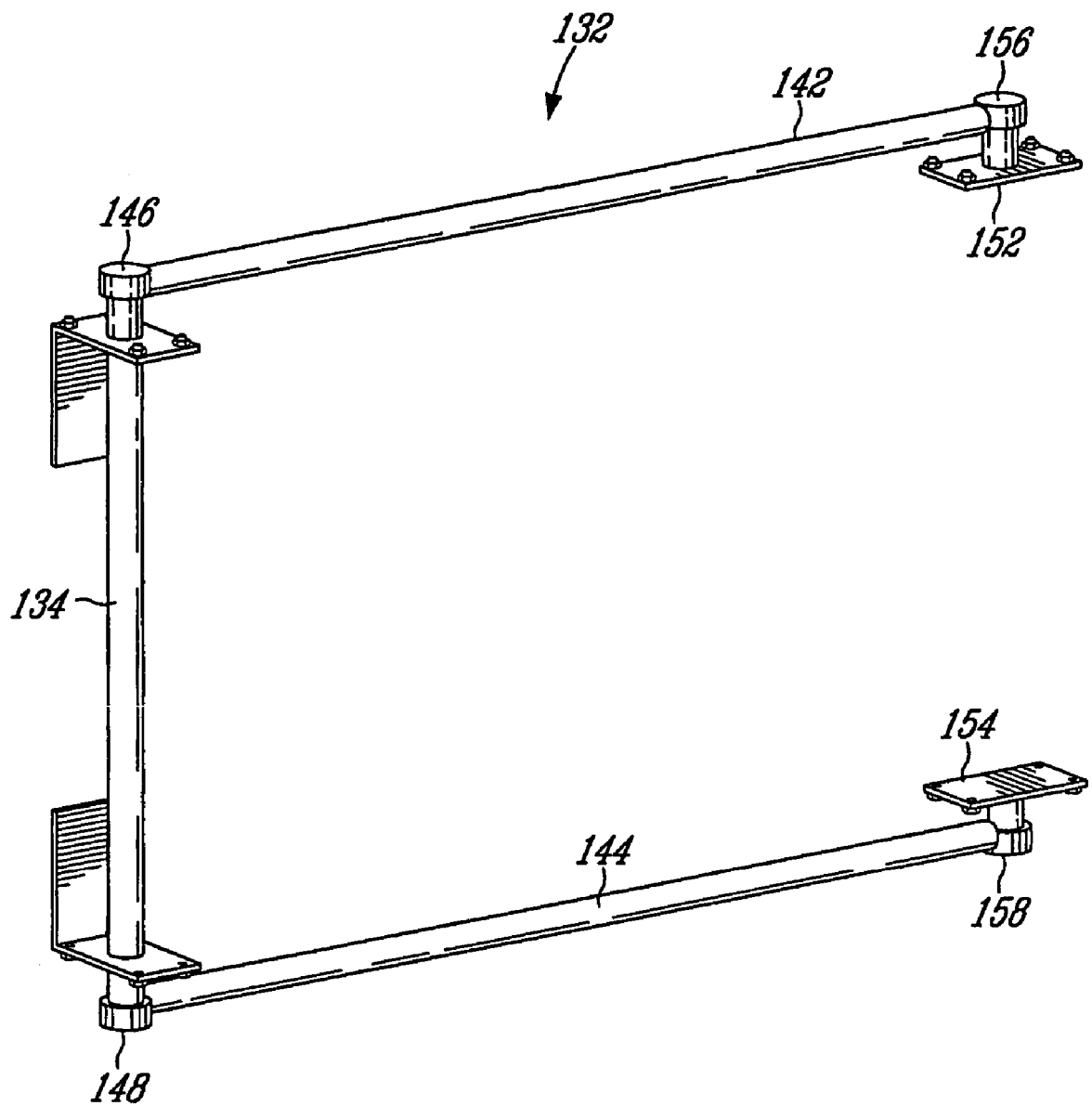
FIG. 19 is a perspective view of the mounting elements in accordance with an embodiment of the present invention.

Mounting elements 128 and 132 are similarly constructed and will be described with reference to FIG. 19, which shows one of the mounting elements 132. The mounting element 132 of FIG. 19 includes a longitudinal member 134, which can be mounted to a surface such as a wall 136, as shown in FIGS. 17 and 18, via fastening elements 138. The mounting element 132 includes extension members 142 and 144. Extension members 142 and 144 are pivotally mounted to the longitudinal member 134 via pivots 146 and 148. The extension members 142 and 144 each include container-mounting elements 152 and 154 respectively, which are pivotally mounted to the free ends of extension members 142 and 144 via pivots 156 and 158 respectively. In this way, the extension members 142 and 144 are brackets which are pivotally mounted to the top and bottom ends 162 and 164 of containers 180 (see FIG. 17), and the top and bottom ends 164 and 166 of containers 190 (see FIG. 18).

It should be noted that extension members 142 and 144 can be adjusted in length and hence, can comprise telescoping members, for example.

Therefore, the mounting elements 128 and 132 of the present invention provide for the containers to be pivoted about longitudinal member 134, to be brought closer and further away from longitudinal member 134, and to be pivoted between the brackets 142 and 144, thus allowing the user to place the containers of the present invention in a variety of positions.

Figure 20:
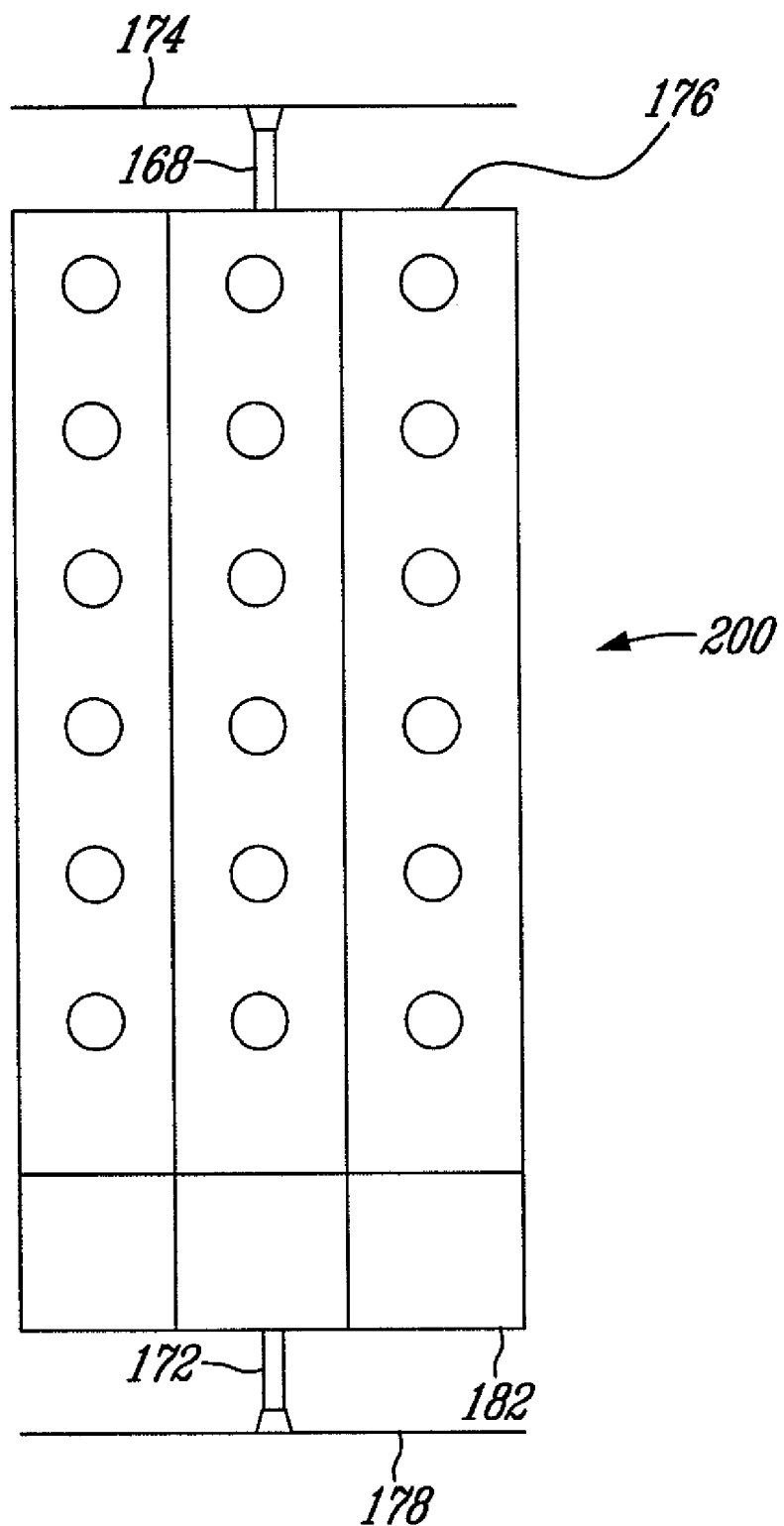
FIG. 20 is a front schematic view of an aeroponic/hydroponic container mounted to top and bottom surfaces via mounting elements in accordance with a further embodiment of the present invention.

FIG. 20 shows the container 200 in accordance with another embodiment of the present invention. This container 200 includes mounting elements 168 and 172. Mounting element 168 is a top member, which is rotatably mounted to a ceiling 174 and pivotally mounted to the top 176 of container 200. Mounting element 172 is a support member, which is pivotally mounted to the floor 178, and pivotally mounted to the bottom 182 of container 200. In this way, the container can be pivotally moved in an axis defined by the mounting elements 168 and 172.

FIGS. 21a, 21b, 21c, and 21d show a mobile light system 184 for illuminating plants in the cultivating compartments 112, in accordance with an embodiment of the present invention. The mobile light system 184 includes a longitudinal guide member 186 and at least one light 188, which is pivotally mounted to a tubular slide 192 for moving the light 182 along the length of the guide member 186. The guide member 186 may be positioned in a vertical, horizontal and/or diagonal position depending on the configuration of the aeroponic/hydroponic container. The lights 182 can be moved manually or via an electronic guiding system, as will be understood by the skilled artisan. Of course, a variety of ways of moving the lights 182 along the length of the guide member 186 can be contemplated within the scope of the present invention.

In other non-illustrated embodiments, a container of the present invention may be mounted to a bracket system that is mounted on a ceiling instead of a wall having more variety of extensions descending therefrom in order to be pivoted about these extensions. In another non-illustrated embodiment, the mounting element can be a longitudinal support member that is mounted between two opposite surfaces, such as two opposite wall members, or a ceiling and floor. The containers of the present invention are mounted on the support member and can be moveable about the support member in translational and/or pivotable movements. Of course, all the mounting elements of the present invention and their sub-components such as their longitudinal members 134 and their extensions 142 and 144 can be extendable and contractible by a variety of means as can be contemplated by the skilled artisan.

The skilled artisan will easily understand that all the elements of the various containers described herein can be combined in a variety of ways to provide for other non-illustrated embodiments which are within the scope of the invention.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention as defined in the appended claims.

What is claimed is:

1. A modular container for aeroponic or hydroponic cultivation of plants, said container comprising:
at least one vertical column comprising at least one cultivating compartment for cultivating plants, said at least one cultivating compartment comprising a removable cover for covering a pot for holding the plant therein;
a vertical nutrient conduit for delivering a nutrient solution to said at least one cultivating compartment, said vertical nutrient conduit being external to said at least one cultivating compartment;
a vertical water conduit in communication with said at least one cultivating compartment, said vertical water conduit being external to said at least one cultivating compartment; and
mounting elements for mounting said container on a vertical support;
wherein when at least two said containers are vertically mounted on a vertical support with one said container adjacently above another said container thereby respectively defining top and bottom containers, said respective-vertical conduits of said containers being in fluid communication.

2. A modular container according to claim 1, wherein at least one of said vertical nutrient conduit and vertical water conduit comprises an intake aperture at a top end thereof and an outtake aperture at a bottom end thereof.

3. A modular container according to claim 2, wherein said outtake aperture of said top container is in fluid communication with said intake aperture of said bottom container.

4. A modular container according to claim 3, wherein said outtake aperture of said top container is in fluid communication with said intake aperture of said bottom container via an auxiliary conduit.

5. A modular container according to claim 4, wherein said auxiliary conduit comprises a short tube.

6. A modular container according to claim 2, wherein said intake aperture is defined by an intake conduit and said outtake aperture is defined by an outtake conduit.

7. A modular container according to claim 3, wherein said intake aperture and outtake aperture are contiguous with respective intake and outtake tube members.

8. A modular container according to claim 1, wherein said vertical nutrient conduit comprises an auxiliary delivery conduit for delivering the nutrient solution to said cultivating compartment.

9. A modular container according to claim 8, wherein said auxiliary delivery conduit provides for pulverizing solution on the roots of plants.

10. A modular container according to claim 1, wherein at least one of said vertical nutrient conduit and vertical water conduit comprises a longitudinal tubular member.

11. A modular container according to claim 1, wherein at least one of said vertical nutrient conduit and vertical water conduit is defined by said vertical column.

12. A modular container according to claim 1 further comprising an enclosed body comprising a front face with said at least one cultivating compartment and an opposite rear face with said mounting elements.

13. A modular container according to claim 1, wherein said cover comprises an aperture for providing plant growth therethough and for allowing light to be exposed with said cultivating compartment.

14. A modular container according to claim 1, wherein said cover comprises an aperture for receiving an irrigation member therethrough.

15. A modular container according to claim 1, wherein said cultivating compartment comprises a front sloped face.

16. A modular container according to claim 1, wherein said cultivating compartment comprises an opening.

17. A modular container according to claim 1 comprising at least two said columns, said at least two columns comprising a plurality of rows of said cultivating compartments.

18. A modular container according to claim 17, wherein said vertical nutrient conduit is positioned between said at least two columns.

19. A modular container according to claim 18, wherein said vertical nutrient conduit is removable.

20. A modular container according to claim 18, wherein said nutrient conduit branches out to a plurality of auxiliary delivery conduits, each said delivery conduits in communication with a respective said cultivating compartment.

21. A modular container according to claim 20, wherein a said auxiliary delivery conduits is selected from the group consisting of an irrigation member, a pulverizing member and a combination thereof.

22. A modular container according to claim 1, wherein said mounting elements are support members for mounting to a vertical surface.

23. A modular container according to claim 1, wherein said vertical nutrient conduit of said bottom container is in communication with an evacuation member.

24. A modular container according to claim 1, wherein said vertical conduit of said bottom container is in communication with a drainage member.

25. A modular container according to claim 1 further comprising a bottom portion, said bottom portion comprising a drainage conduit in communication with said water conduit, said bottom portion comprising a membrane for substantially blocking solid material from entering into said drainage conduit.

26. A modular container according to claim 25, wherein said bottom portion comprises a front wall a bottom wall and a rear wall, said membrane being mounted between said front and rear walls.

27. A modular container according to claim 26, wherein said membrane and said bottom wall define a cavity therebetween, said cavity being in fluid communication with said drainage conduit.

28. A modular container according to claim 25, wherein said membrane comprises perforations and is covered with a tissue.

29. A modular container according to claim 28, wherein said tissue comprises geodesic tissue.

30. A modular container according to claim 1, further comprising a receptacle portion at a bottom portion of said container.

31. A modular container according 1, wherein said mounting elements comprise two brackets and wherein said container is mounted therebetween.

32. A modular container according to claim 1, further comprising a mobile light system for illuminating the plants in said cultivation compartments.

* * * * *